(12) United States Patent
Furumi et al.

(10) Patent No.: US 6,371,239 B2
(45) Date of Patent: Apr. 16, 2002

(54) REAR WHEEL STEERING APPARATUS

(75) Inventors: Hiroshi Furumi; Kunio Shirakawa, both of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/745,685

(22) Filed: Dec. 22, 2000

(30) Foreign Application Priority Data

Feb. 14, 2000 (JP) ........................................ 2000-034924

(51) Int. Cl.⁷ ................................................ B62D 5/04
(52) U.S. Cl. ........................................ 180/445; 180/404
(58) Field of Search ................................ 180/443, 445, 180/408, 412, 413, 404, 405, 406; 701/41, 42

(56) References Cited

U.S. PATENT DOCUMENTS 5,261,501 A * 11/1993 Tsuchiya et al. ............ 180/404
5,957,987 A * 9/1999 Sudo et al. .................. 180/412
6,223,851 B1 * 5/2001 Furumi et al. ............... 180/404

FOREIGN PATENT DOCUMENTS

JP    2000-16312    1/2000

* cited by examiner

Primary Examiner—Kevin Hurley
(74) Attorney, Agent, or Firm—Merchant & Gould P.C.

(57) ABSTRACT

A rear wheel steering apparatus is disclosed which comprises a pair of threaded members which are threaded in a direction opposite to one another, a pair of slide members engaging with the threaded members, respectively, and movable toward and away from one another due to reverse thread action, a steering shaft for steering a pair of rear wheels, and an electric motor for rotating the threaded members to move the steering shaft coupled to one of the slide members toward one of the rear wheels for thereby steering the rear wheels. In the rear wheel steering apparatus which further comprises control means 40 and 45 for controlling the electric motor, and motor drive means including a bridge circuit composed of four switching elements for enabling forward or reverse rotations of the electric motor on the basis of a signal delivered from the control means, the improvement comprises a trouble compensation circuit 70 constituted independently of the control means 40 and 50 for turning on the switching elements for a given time interval, during a failure taking place in the control means 40 and 50, so as to drive the electric motor in a direction to cause the pair of slide members to move toward each other.

19 Claims, 8 Drawing Sheets

REAR WHEEL STEERING APPARATUS

FIELD OF THE INVENTION

This invention relates to steering systems for vehicles and, more particularly, to a rear wheel steering apparatus for a four-wheel steering system to achieve steering of the rear wheels in accordance with a steering angle of front wheels.

BACKGROUND OF THE INVENTION

It is well known in the art to have a vehicle provided with a four-wheel steering system which includes a rear wheel steering apparatus designed to steer rear wheels in accordance with the steering of front wheels. In a typical example of the rear wheel steering apparatus, the rear wheels are steered in the same phase as the front wheels to improve the traveling stability at high cruising speed or/and in the reverse phase to steer the rear wheels in a direction opposite to the front wheels in order to achieve the maneuverability of the vehicle for smaller turns.

In general, the rear wheel steering apparatus is designed to have a steering shaft which is connected to a pair of rear wheels via a linkage mechanism in which the steering shaft is moved to one side of the rear wheels for thereby steering the rear wheels. The conventional rear wheel steering apparatus employs, for example, a system including a steering shaft in which threaded members are disposed in parallel to each other, and a pair of sliding members which are reciprocated on the threaded members to thereby move the steering shaft in left and right directions. In this system, one of the sliding members are coupled to the steering shaft by means of a clutch mechanism by which the reciprocating movement of the sliding members causes the steering shaft to move toward the sliding member. With this structure, the steering shaft is moved rightward and leftward in an axial direction and the rear wheels are steered in the rightward or leftward directions. Also, the rear wheel steering apparatus employs control means to enable setting of the target steering angle and the steering direction of the rear wheels in accordance with a steering information of the front wheels for thereby controlling the rear wheels in the steering direction by an amount equal to the deviation from the target steering angle. In addition, the rear wheel steering apparatus of the type described above is generally incorporated with a fail-safe system for automatically restoring the rear wheels to their straight cruising direction during abnormal operation of the system such as troubles in a steering angle sensor, etc. Consequently, when troubles occur in the system of the rear wheel steering apparatus, the vehicle which employs the four-wheel steering system is automatically switched over to a two-wheel steering mode for only front wheels.

For example, Japanese Patent Application No. 10-182090 which was filed by the same applicant discloses an electric rear wheel steering apparatus related to an invention of an electric steering control system. In order to move the afore-mentioned sliding members, the electric rear wheel steering apparatus includes the afore-mentioned threaded member (rotatable shaft) having a pair of threaded portions which are threaded from a center of the shaft in directions opposite to one another and which engage with a pair of sliding members (sliding block), respectively. Further, the electric rear wheel steering apparatus includes an electric motor to actuate the threaded members in their forward or reverse rotations for thereby moving the pair of sliding members in close to or away from one another due to reversed thread action. The electric rear wheel steering apparatus further includes a first motor driving circuit for normal use and a second motor driving circuit for use in trouble condition to supply electric current to the electric motor. The electric rear wheel steering apparatus also includes an electronic control unit arranged to produce an output signal during a normal cruising for supplying the electric current to the electric motor via the first motor driving circuit. The electric rear wheel steering apparatus further includes a fail-safe system having a trouble detecting circuit by which, when system troubles such as failures in the first motor driving circuit are detected, the second motor driving circuit supplies the electric current to the electric motor by which the sliding members are moved in close to each other toward their respective neutral positions.

However, the rear wheel steering apparatus mentioned above encounters a problem in that, when a control means such as the electronic control unit or the trouble detecting circuit is defected, the rear wheels can not be restored to the neutral position. Namely, the electric rear wheel steering apparatus can not render the motor driver circuit to be switched over from its normal operation mode to a trouble compensation mode even when the system trouble takes place. For this reason, the electric rear wheel steering apparatus functions to continue the steering operation of the rear wheels because of the electric current being applied to the electric motor from the motor driver circuit in response to the output signal produced by the electronic control unit even in a case where the system trouble takes place.

SUMMARY OF THE INVENTION

The present invention has been made in view of the above-described inadequacies of the related art and has an object to provide a new rear wheel steering apparatus which enables rear wheels of a vehicle to restore in a straight cruising mode even when a system trouble takes place in the control means.

The rear wheel steering apparatus which solves the above-mentioned drawbacks comprises an electric motor, a pair of threaded members which are threaded in directions opposite to one another, a pair of slide members movable in close to or apart from each other due to reversed thread action, and a steering shaft which steers the pair of rear wheels, provided that the electric motor rotates the threaded members so as to move the steering shaft connected to one of the slide members toward one of the rear wheels for thereby steering the rear wheels. The rear wheel steering apparatus further comprises control means for controlling the electric motor, and motor driver means comprised of a bridge circuit including four switching elements for driving the electric motor in its forward or reverse direction. The rear wheel steering apparatus features the provision of a trouble compensation circuit provided independently of the control means for turning on the switching elements for a given time interval, during a trouble condition taking place in the control means, so as to move the pair of sliding members in a direction close to each other when the control means is defected.

According to the rear wheel steering apparatus of the present invention, the trouble compensation circuit is arranged to turn on the switching elements for a given time interval by which the electric motor is driven for that time interval. In this manner, the rear wheel steering apparatus rotates the threaded members in a direction to approach each other due to rotation of the electric motor. As a result, the rear wheel steering apparatus causes the sliding members to return to their neutral positions during the given time interval for thereby restoring the steering shaft to its neutral position so that the rear wheels are restored to a straight cruising direction. In the meantime, the given time interval is designed to have a value sufficient for driving the electric motor so as to move the pair of sliding members in a direction to approach each other to enable the steering shaft to restore its neutral position even in a case where the steering shaft is moved for maximum distance. In this connection, the given time interval is set to a value of 10 seconds in the preferred embodiment of the present invention.

Other and further features, advantages, and benefits of the present invention will become more apparent in the following description taken in conjunction with the following drawings. It is to be understood that the foregoing general description and the following detailed description are exemplary and explanatory but are not to be restrictive of the invention. The accompanying drawings which are incorporated in and constitute a part of the invention, illustrate embodiments of the invention and, together with the description, serve to explain the principles of the invention in general terms.

BRIEF DESCRIPTION OF THE DRAWINGS

FIG. 6 is an illustration of an operation of engaging claws of left and right intermediate slide cylinders shown in FIG. 1, wherein

DESCRIPTION OF THE PREFERRED EMBODIMENTS

A preferred embodiment of a rear wheel steering apparatus according to the present invention will now be described in detail with reference to the drawings.

The rear wheel steering apparatus embodying the present invention enables slide members and a steering shaft to restore its neutral position to effect straight cruising of rear wheels when a control unit of the steering apparatus encounters a trouble. The rear wheel steering apparatus is incorporated in a four-wheel steering system for vehicles to control steering of the rear wheels in accordance with front wheel steering angles, for thereby improving driving stability at high cruising speed as well as maneuverability. The word "vehicles" may cover various vehicles such as large-sized vehicles for road building construction work, and automotive vehicles, etc.

The rear wheel steering apparatus according to the present invention includes two CPUs (Central Processing Units), viz., one for main CPU and another for a sub-CPU both of which constitute a control means. Further, the rear wheel steering apparatus includes a trouble compensation circuit which restores the rear wheels to the straight cruising direction in a case where at least one of the two CPUs is defected. In the preferred embodiment of the present invention, the rear wheel steering apparatus is mounted on a usual four-wheel vehicle and is combined with a front wheel steering apparatus, thus constituting a four-wheel steering system.

It is to be noted that, in the following description, the term "forward" means a forward cruising direction of the vehicle and the term "rearward" means a rearward cruising direction of the vehicle. Further, the term "leftward and rightward directions" means a width direction of the vehicle, the term "left" means a left side of the vehicle in its forward running condition and the term "right" means a right side of the vehicle in its forward running condition.

Figure 1:
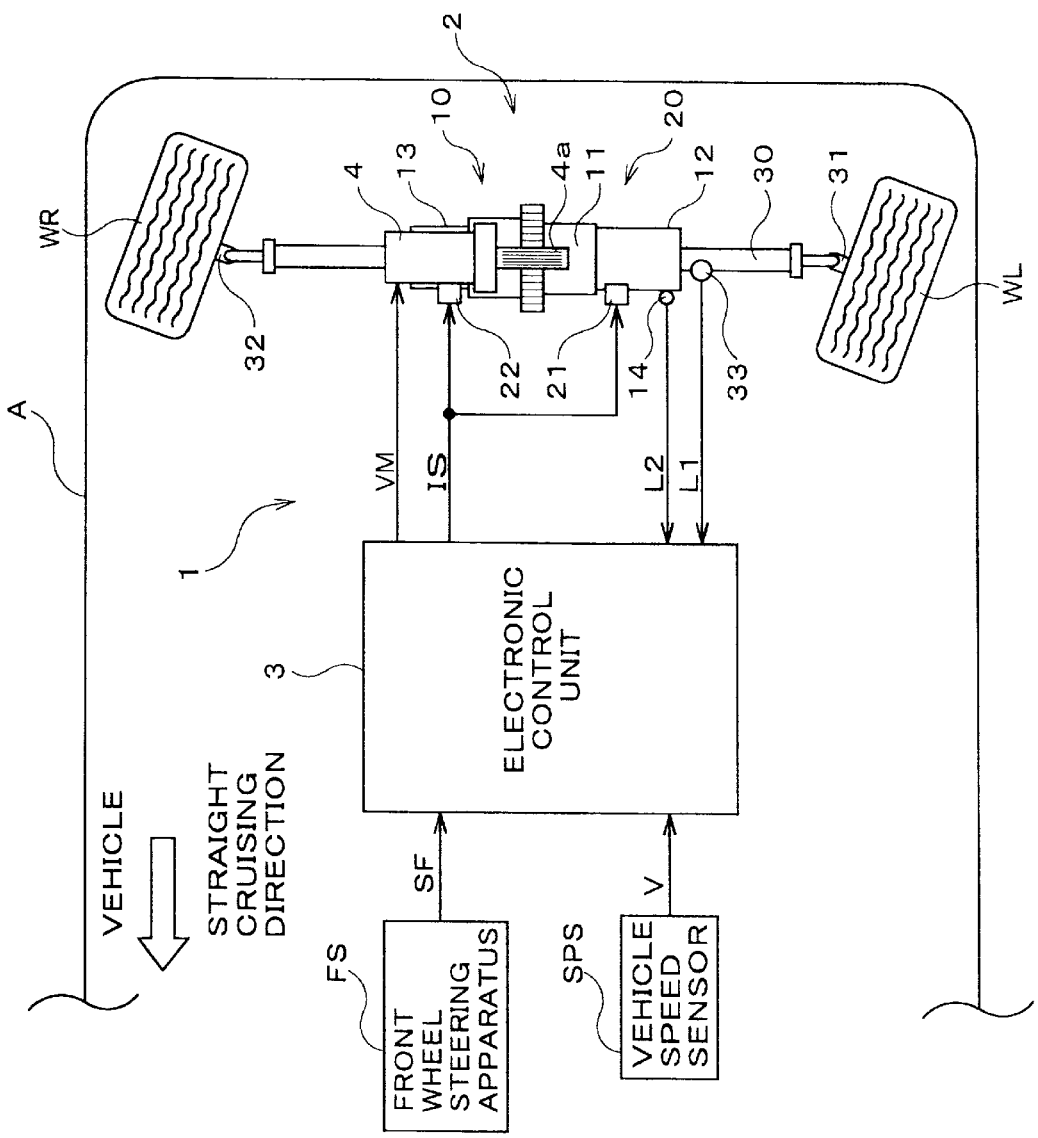
FIG. 1 is a schematic view of a general structure of a rear wheel steering apparatus in accordance with a preferred embodiment of the present invention.

Turning now to the drawings and, initially, to FIG. 1, there is shown an overall structure of a rear wheel steering apparatus 1 of a preferred embodiment of the present invention. The rear wheel steering apparatus 1 mainly comprises a rear wheel steering mechanism 2, an electronic control unit 3 and an electromotor 4.

In the preferred embodiment of the present invention, the electromotor 4 is defined as an electric motor in scope of claims.

The rear wheel steering mechanism 2 constitutes a mechanical part of the rear wheel steering apparatus 1 for steering a pair of rear wheels WL and WR. The mechanical part is connected to and driven by the electronic control unit 3 which drives the electric motor 4 to apply a rotatable drive power to the mechanical part. The rear wheel steering mechanism 2 is constituted by a mechanical structure to mechanically enable the rear wheels to be positioned in a neutral position (namely, in the straight cruising direction of the rear wheels WL and WR) without depending upon a control by a precision sensor. In order to achieve this end, the rear wheel steering mechanism 2 comprises a linear drive mechanism 10 for converting the rotating drive power of the electric motor 4 to the linear drive power, a clutch mechanism 20 for selecting steering directions, and a steering shaft 30 which is movable leftward or rightward to steer the rear wheels WL and WR.

Figure 2:
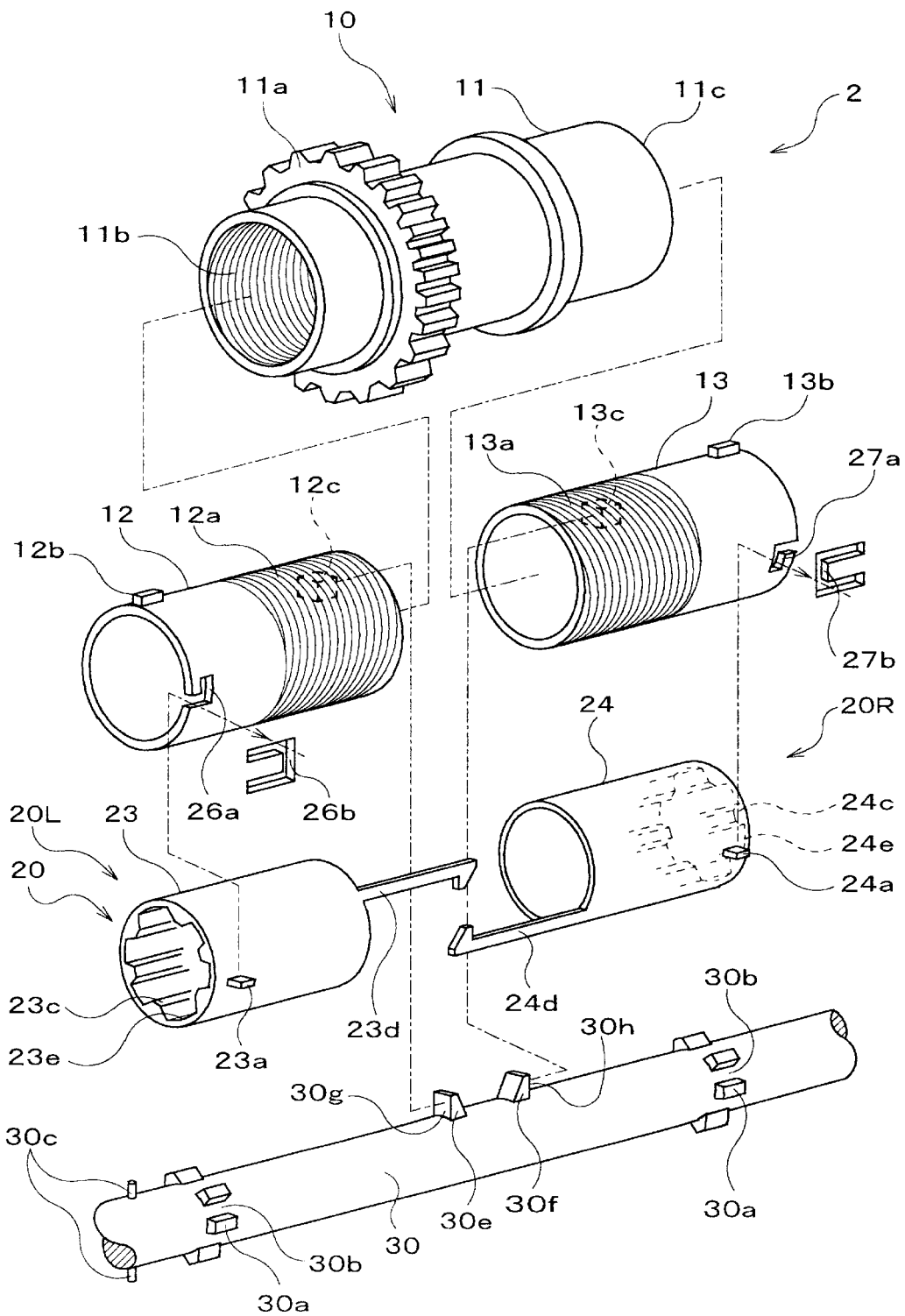
FIG. 2 is a perspective, disassembled view of a rear wheel steering mechanism of the rear wheel steering apparatus shown in FIG. 1.

The rear wheel steering mechanism 2 constitutes a screw type protruding and contracting mechanism composed of the clutch mechanism 20 which are divided into two function blocks which are movable in opposite directions relative to a point symmetry, and a concentric, triple cylinder structure. More specifically, the linear drive mechanism 10 of the rear wheel steering mechanism 2 includes a single, outer rotatable cylinder 11 driven by the electric motor 4, and a pair of intermediate slide cylinders 12 and 13 which extend or retract in the outer rotatable cylinder 11 in left and right directions (viz., in an axial direction of the steering shaft 30). Namely, in order to steer the rear wheels WL and WR, the intermediate slide cylinders 12 and 13 are caused to extend outward through the outer rotatable cylinder 11 in left and right directions to be separate from one another whereas in case of restoring the rear wheels to their straight directions, the intermediate slide cylinders 12 and 13 are retracted within the outer rotatable cylinder and are halted at respective neutral positions. As shown in FIG. 2, the rear wheel steering mechanism 2 also causes left and right function blocks 20L and 20R of the clutch mechanism 20 to be operatively disposed in the intermediate slide cylinders 12 and 13, respectively, with one of the intermediate slide cylinders 12 and 13 being operatively connected to the steering shaft 30 by means of the clutch mechanism 20. In this manner, the rear wheel steering mechanism 2 moves the steering shaft 30 rightward to steer the rear wheels WL and WR in leftward direction and moves the steering shaft 30 leftward to steer the rear wheels WL and WR in rightward direction. Further, the rear wheel steering mechanism 2 includes left and right linkage mechanisms 31 and 32 having tie rods and knuckle arms (not shown) through which the steering shaft 30 is connected to the rear wheels WL and WR.

Also, in the preferred embodiment of the present invention, the outer rotatable cylinder 11 is defined as a threaded member in the scope of claims, wherein the intermediate slide cylinders 12 and 13 are defined as slide members while the steering rod 30 is used directly as it is. Further, in the preferred embodiment of the present invention, the term "outward" means an outside of the a vehicle A in its width direction and the term "inward" means a central portion of the vehicle A in its width direction.

In FIG. 1, the electronic control unit 3 responds to a front wheel steering information signal SF delivered from a front wheel steering apparatus FS and vehicle speed signal V delivered from a vehicle speed sensor SPS for thereby enabling the setting of a target steering angle and a steering direction of the rear wheels WL and WR. Further, the electronic unit 3 is designed to produce a solenoid current signal IS for energizing left and right electromagnet actuators 21 and 22, and a motor voltage signal VM for driving the electric motor 4 in response to the target steering information and the steering direction which are already set, for thereby controlling the electromagnet actuators 21 and 22, and the electric motor 4.

As shown in FIG. 1, the electric motor 4 has a reduction gear mechanism 4a by which the outer rotatable cylinder 11 is driven in forward or reverse directions. In this instance, the pair of intermediate slide cylinders 12 and 13 are moved away from each other when the outer rotatable cylinder 11 is rotated in forward direction, whereas, when the outer rotatable cylinder 11 is rotated in the reverse direction, the pair of the intermediate slide cylinders 12 and 13 come close to one another. The electric motor 4 is composed of, for example, a direct current motor which rotates in forward or reverse directions in response to the motor voltage VM inducing the electric motor current IM. Also, the electric motor 4 may comprise motors of any other types with the use of various driver circuits depending on the types of excitation system.

Turning now to FIGS. 2 to 6, the rear wheel steering mechanism 2 will be described in detail. The rear wheel steering mechanism 2 serves to convert the rotational drive power of the electric motor 4 to the linear drive power due to the action of the linear drive mechanism 10. To this end, the rear wheel steering mechanism 2 has the linear drive mechanism 10 connected to the steering shaft 30 by means of one of the left and right function blocks 20L and 20R of the clutch mechanism 20 whereby the steering shaft 30 is moved due to the action of the linear drive mechanism 10. In this instance, if the linear drive mechanism 10 is connected to the steering shaft 30 by means of the left function block 20L, the steering shaft 30 is moved leftward, thereby steering the rear wheels WL and WR in the right direction. On the other hand, if the linear drive mechanism 10 is connected to the steering shaft 30 by means of the right function block 20R, the steering shaft 30 is moved rightward, thereby steering the rear wheels WL and WR in the left direction. Further, the rear wheel steering mechanism 2 serves to restore the steering shaft 30 to its neutral position for thereby aligning the rear wheels WL and WR in straight direction.

Turning now to FIGS. 2, the linear drive mechanism 10 will be described in detail. The linear drive mechanism 10 is mainly composed of the outer rotatable cylinder 11, and left and right intermediate slide cylinders 12 and 13.

The outer rotatable cylinder 11 has its outer periphery formed with an outer ring gear 11a which engages with a final gear 4b (see FIG. 4) of a reduction gear unit 4a. With this construction, the outer rotatable cylinder 11 will be rotated by the rotational drive power transmitted to the outer gear 11a from the drive gear of the electric motor 4 via the reduction gear unit 4a. Also, the outer rotatable cylinder 11 is rotatably supported in a casing (not shown).

Further, the outer rotatable cylinder 11 has its inner periphery formed with left and right threaded portions 11b and 11c, both of which extends leftward and rightward, respectively from a central portion of the outer rotatable cylinder 11, provided that the left and right threaded portions are threaded in direction opposite to one another. In addition, the outer rotatable cylinder 11 has its left and right portions internally provided with the intermediate slide cylinders 12 and 13, respectively, in concentric relation to each other.

The intermediate slide cylinders 12 and 13 have outer peripheries formed with outer threaded portions 12a and 13a, respectively, both of which extends toward the irrespective central portions from their respective inner ends, and both of which engage with the left and right threaded portions 11b and 11c, respectively. Further, the intermediate slide cylinders 12 and 13 have their respective outer peripheries provided with movable projections 12b and 13b, respectively, each of which serves as a sliding guide. In addition, the intermediate slide cylinders 12 and 13 are internally provided with movable projections 12c and 13c, both of which are located near the respective inner end sides to face the steering shaft 30. These projections 12b and 13b are slidably received in an axial recess (not shown) formed in the casing such that the intermediate slide cylinders 12 and 13 can not be rotated with respect to the casing.

For this reason, when the outer rotatable cylinder 11 is rotated with respect to the casing, the intermediate slide cylinders 12 and 13 move in left and right directions, respectively, in an axial direction relative to the casing since the intermediate slide cylinders 12 and 13 engage with the outer rotatable cylinder 11. Accordingly, when the electric motor 4 is rotated in the forward direction, the intermediate slide cylinders 12 and 13 protrude outward from the outer rotatable cylinder 11 to move away from each other. During the outward movement of the intermediate slide cylinders 12 and 13, the projections 12b and 13b abut against the respective outermost positions. To this end, the mounting positions and mounting directions of the respective parts are preliminarily adjusted in the casing such that the intermediate slide cylinders 12 and 13 protrude beyond their respective outermost positions. On the other hand, when the electric motor 4 is rotated in the reverse direction, the intermediate slide cylinders 12 and 13 are retracted inward within the outer rotatable cylinder toward their neutral positions.

Figure 4:
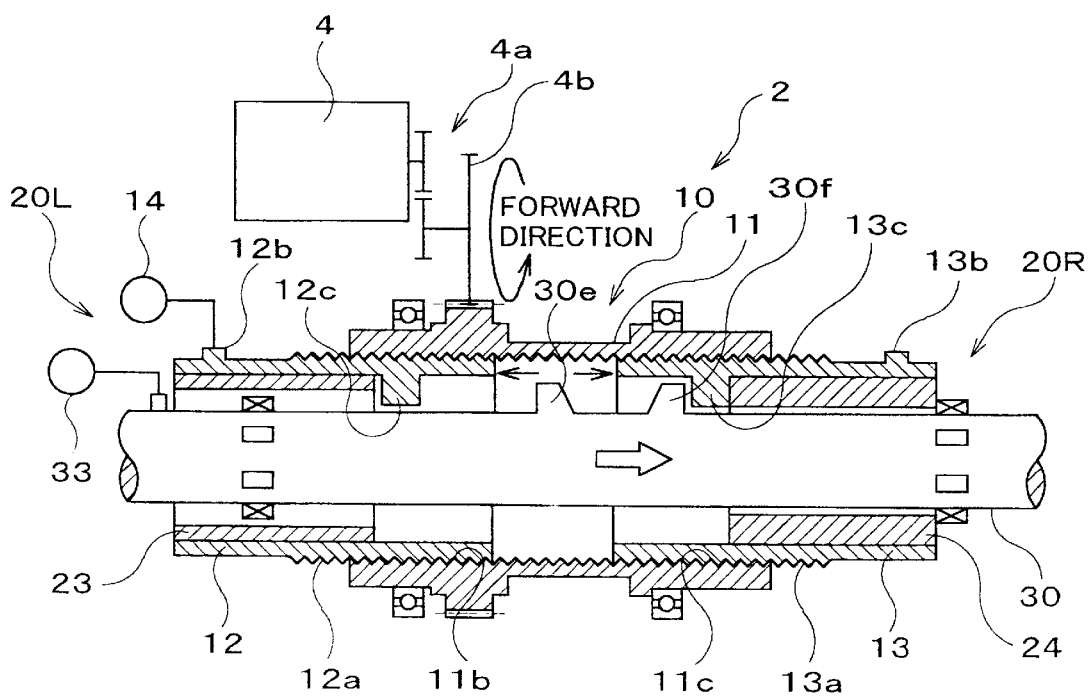
FIG. 4 is a partial sectional view showing essential part of the rear wheel steering mechanism of the rear wheel steering apparatus of FIG. 1, wherein an electric motor is driven its forward direction and a steering rod is moved rightward.

As shown in FIGS. 1 and 4, one of the intermediate slide cylinders 12 and 13 also has a drive stroke sensor 14. In this preferred embodiment, the drive stroke sensor 14 is located at a position aligned in the protruding direction of the projection 12b of the left intermediate slide cylinder 12, thereby detecting the movement stroke L in an axial direction of both of the intermediate cylinders 12 and 13.

Figure 3:
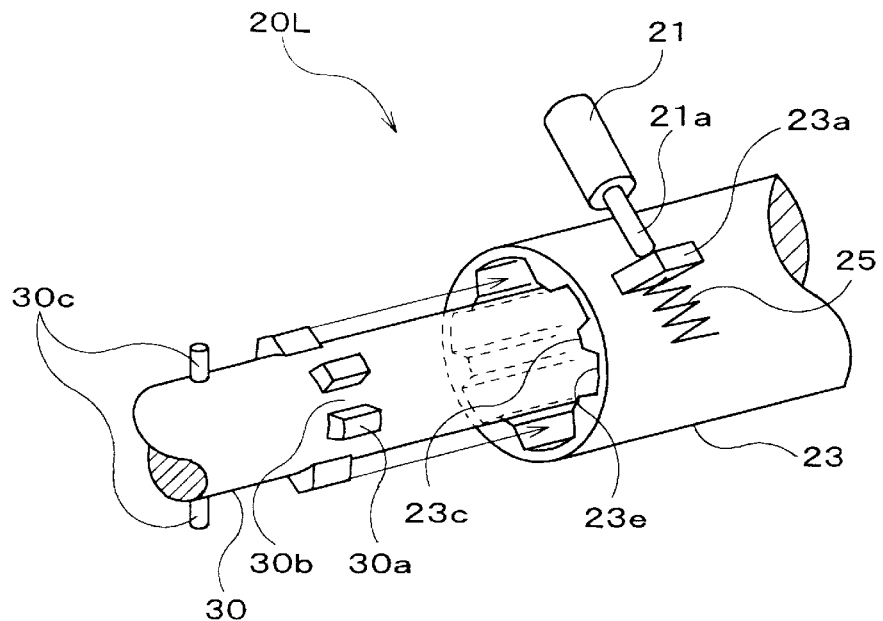
FIG. 3 is a perspective view of a left-side function block of a clutch mechanism shown in FIG. 2.

Turning to FIGS. 2 and 3, the clutch mechanism 20 will be described in detail. As noted above, the clutch mechanism 20 has left and right function blocks 20L and 20R which are accommodated in the left and right intermediate slide cylinders 12 and 13, respectively. The left function block 20L and the right function block 20R have the same structure in symmetric relation to each other and, so, the structure of the left function block 20L will be described in detail below with reference to FIG. 3.

In FIG. 3, the left function block 20L is composed of a left electromagnet actuator 21, a left internal clutch cylinder 23, a left spring 25, a guide through-recess 26a and a guide through-recess 27a.

The left electromagnet actuator 21 incorporates a solenoid therein and is located near an outer periphery of the left internal clutch 23. The left electromagnet actuator 21 serves as an actuator to move a solenoid pin 21a when the solenoid is energized. In this connection, the electromagnetic actuator may be modified so as to cause rocking of the movable pin due to rotational action by changing the mounting position and the mounting direction of an actuating mechanism.

The left internal clutch 23 is held in sliding engagement with the left intermediate slide cylinder 12 and is slidably rotatable in concentric relation with the left intermediate slide cylinder 12. The left internal clutch cylinder 23 has its outer periphery formed at its outer end portion with an arm-shaped clutch lever 23a. The clutch lever 23a protrudes through the guiding through recess 26a formed in the left intermediate slide cylinder 12 and is movable through the guiding through recess 26a.

As clearly shown in FIG. 2, the guide through-recess 26a is formed at a terminal end of the left intermediate slide cylinder 12 and has an L-shape which extends from the inner periphery to the outer periphery of the intermediate slide cylinder 12. Likewise, the casing is also formed with the guide recess 26b. The left internal clutch 23 is urged counterclockwise with respect to the end of the axis by the left spring 25 via the clutch lever 23a. The left spring 25 may, for example, be formed of a spring such as a twisted spring.

For the above reason, the left function block 20L operates as follows. Namely, if the left electromagnet actuator 21 is energized when the intermediate slide cylinders 12 and 13 are held in the neutral positions, the end portion of the movable pin 21a protrudes. In this instance, the clutch lever 23a is moved downward along the guide through-recess 26a and the guide recess 26b against the rotational force given by the left spring mechanism 25. During this movement, the clutch lever 23a is guided by the guide through-recess 26a and the guide recess 26b, whereby the left internal clutch cylinder 23 is rotated (clockwise as seen from the end of the axis) within the left intermediate slide cylinder 12 by a certain rotational angle. Namely, the left internal clutch cylinder 23 is rotatable only when the intermediate slide cylinders 12 and 13 are held in the neutral position by which the clutch lever 23a is enabled to be guided by the guide through-recess 26a and the guide recess 26b.

Further, the left internal clutch cylinder 23 has an inner periphery formed with a plurality of clutch teeth 23c which extend inward from the end of the cylinder 23. In this case, the clutch teeth 23c are formed to have a certain circumferential pitch. On the other hand, the steering shaft 20 has an outer periphery formed with a plurality of engagement teeth 30a equal in number with the clutch teeth 23c. These engagement teeth 30a have the same pitch as the clutch teeth 23c and are formed at positions corresponding to the clutch teeth 23c. As a result, each of the engagement teeth 30a and each of the clutch teeth 23c is enabled to engage with one another by means of spline coupling, with each engagement teeth 30a being enabled to slide in a hollow recess 23e formed between the adjacent clutch teeth 23c. Consequently, it is thus possible to energize the left electromagnet actuator 21 to move the clutch lever 23a downward for rotating the left internal clutch cylinder 23 so that each of the clutch teeth 23c slides into the hollow recess 30b formed between the adjacent engagement teeth 30a.

With the above arrangement, when the left and right electromagnet actuators 21 and 22 (see FIG. 1) are not supplied with the electric current and not excited, the left and right function blocks 20L and 20R and the steering shaft 30 engage with each other, thereby providing the clutch-on state. On the other hand, when the left and right electromagnet actuators 21 and 22 (see FIG. 1) are applied with the electric current to be excited, the left and right function blocks 20L and 20R and the steering shaft 30 are brought out of engagement from each other, thereby providing the clutch-off state. Since, also, the intermediate slide cylinders 12 and 13 have a structure by which the internal clutch cylinders 23 and 24 are not returned to their original locations (viz., non-rotatable) because of the guide recesses 26b and 27b under a condition in which the clutch cylinders 12 and 13 assume a position out of the neutral position, the left and right function blocks 20L and 20R are not actuated.

Further, the internal clutch cylinders 23 and 24 have internal ends formed with engagement claws 23d and 24d, respectively. More specifically, the engagement claws 23d and 24d axially protrude so as to engage each other when both of the internal clutch cylinders 23 and 24 are rotated simultaneously to prevent the leftward and rightward movement of the left and right internal clutch cylinders 23 and 24.

The steering shaft 30 will be described with reference to FIGS. 2 and 3. The steering shaft 30 is inserted through the internal clutch cylinders 23 and 24. Also, the steering shaft 30 is connected at their ends to the rear wheels WL and WR via the linkage mechanisms 31 and 32 (see FIG. 1) each including tie rods and knuckle arms, both of which are not shown. Thus, the rear wheels WL and WR are steered by king pins (not shown).

Further, the steering shaft 30 has one of the axial ends of its outer periphery formed with a pair of guide pins 30c. The steering shaft 30 is arranged such that the guide pins 30c slide along the guides (not shown) formed in a hollow shape in the casing, and is movably supported in the casing but is non-rotatable relative to the casing.

In addition, the steering shaft 30 has a central portion formed at its outer periphery with a pair of left and right centering projections 30e and 30f extending toward the left and right intermediate slide cylinders 12 and 13. Also, the fore-mentioned movable projections 12c and 13c of the left and right slide cylinders 12 and 13 are formed at positions to abut against axially and outwardly facing, surfaces 30g and 30h of the left and right centering projections 30e and 30f.

As shown in FIGS. 1 and 4, the steering stroke sensor 33 is located at a position near the protruding directions of the guide pins 30c to enable detection of the axial movement stroke of the steering shaft 30. Thus, the steering stroke sensor 33 serves to detect the leftward and rightward travel directions of the steering shaft 30 and the travel distance L1.

Figure 5:
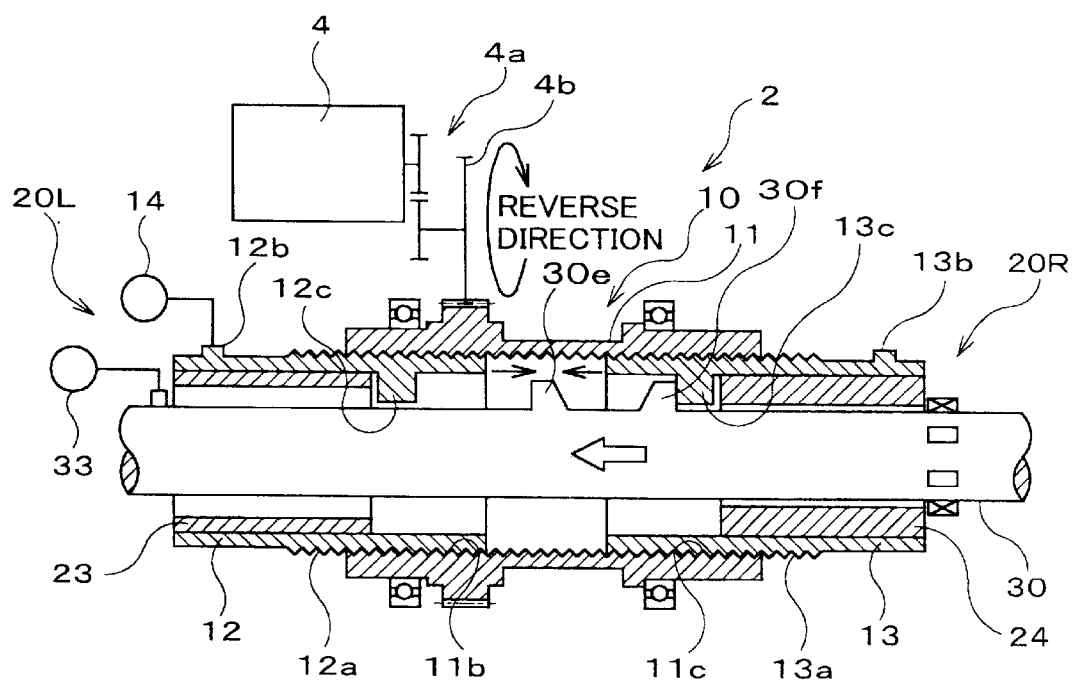
FIG. 5 is a partial sectional view of an essential part of the rear wheel steering mechanism of the rear wheel steering apparatus of FIG. 1, wherein an electric motor is driven in its reverse direction after the steering rod is moved rightward.

Now, the operation of the rear wheel steering mechanism 2 will be described below with reference to FIGS. 4 and 5. Here, the explanation of the operation will be made with respect to an example of operation in a case where the steering shaft 30 is initially moved rightward to steer the rear wheels WL and WR leftward and, after the steering action, the steering shaft 30 is then returned to its neutral position to restore the rear wheels WL and WR in their straight cruising direction.

Now, assuming that the left electromagnet actuator 21 (see FIG. 1) is excited when the left and right intermediate slide cylinders 12 and 13 are held in their respective neutral positions and the clutch lever 23a of the left internal clutch cylinder 23 is moved downward by the movable pin 21a as shown in FIG. 3l the left internal clutch cylinder 23 is rotated so that the each of the clutch teeth 23c (see FIG. 2) of the steering shaft 30 is rotated to a position to oppose to each of the hollow recess 30b of the steering shaft 30. In this instance, the left function block 20L and the steering shaft 30 disengage each other, viz., in the clutch-off condition. Since, at this time instant, the right electromagnet actuator 22 is not excited, the right function block 20R engages with the steering shaft 30 via each of the engagement teeth 30a. As a result, the steering shaft 30 is coupled to the right intermediate slide cylinder 13 via the right function block 20R so that the steering shaft 30 is movable rightward with the right intermediate slide cylinder 13.

As shown in FIG. 4, when the electric motor 4 is rotated in the forward direction, the outer rotatable cylinder 11 is also rotated. In this instance, the left and right intermediate slide cylinders 12 and 13 move out of the outer rotatable cylinder 11 to be separate from each other due to the reverse thread action of the threaded portions 11b and 11c of the outer rotatable cylinder 11 and the threaded portions 12a and 13a of the left and right intermediate slide cylinders 12 and 13.

During this time interval, while each of the clutch teeth 23c of the left internal clutch cylinder 23 does not engage with each of the engagement teeth 30a of the steering shaft 30, each of the clutch teeth 24c of the right clutch cylinder 24 engages with each of the engagement teeth 30a of the steering shaft 30 (see FIG. 2). As a result, the steering shaft 30 is pushed toward the right intermediate slide cylinder 13 via the right internal clutch cylinder 24, the steering shaft 30 is moved rightward in accordance with the protruding action of the right intermediate slide cylinder 13. Further, the rightward movement (namely, the movement toward the right rear wheel WR) of the steering shaft 30 causes the rear wheels WL and WR to be steered in the left direction relative to the straight cruising direction of the vehicle A.

After the completion of the steering action, if the electric motor 4 is rotated in the reverse direction, the outer rotatable cylinder 11 rotates in the reverse direction. As a consequence, the left and right intermediate slide cylinders 12 and 13 retract within the outer rotatable cylinder 11 due to the reverse thread action of the threaded portions 11b and 11c of the outer rotatable cylinder 11 and the threaded portions 12a and 13a of the left and right intermediate slide cylinders 12 and 13. During this time interval, the movable projection 13c of the right intermediate slide cylinder 13 is moved leftward and brought into abutment with the centering projection 30f of the steering shaft 30. Furthermore, since the centering projection 30f is moved leftward following the movement of the movable projection 13c, the steering shaft 30 is forced leftward in accordance with the retracting movement of the right intermediate slide cylinder 13. During the leftward movement of the steering shaft 30 (namely, the movement toward the left rear wheel), the both of the rear wheels WL and WR are steered to their neutral positions from their left directions. In this manner, the steering shaft 30 and the left and right intermediate slide cylinders 12 and 13 are restored to their neutral positions, and thus the steering direction of both the rear wheels WL and WR are restored to their straight cruising direction.

During the above-discussed rear wheel steering operation, the electronic control unit 3 watches the left and right intermediate slide cylinders 12 and 13 and the steering shaft 30 by means of the drive stroke sensor 14 and the steering stroke sensor 33, and controls the left and right electromagnet actuators 21 and 22 and the electric motor 14. In this manner, the rear wheel steering apparatus 1 makes it possible to steer the rear wheels WL and WR in leftward or rightward directions in cooperation with the steering state of the front wheels while enabling the rear wheels in the straight direction during trouble for thereby realizing the rear wheel steering operation to assist a stable attitude control of the vehicle A.

Next, the operation of the engagement claws 23d and 24d of the left and right internal clutch cylinders 23 and 24 will be described in detail below with reference to FIG. 6.

Figure 6A:
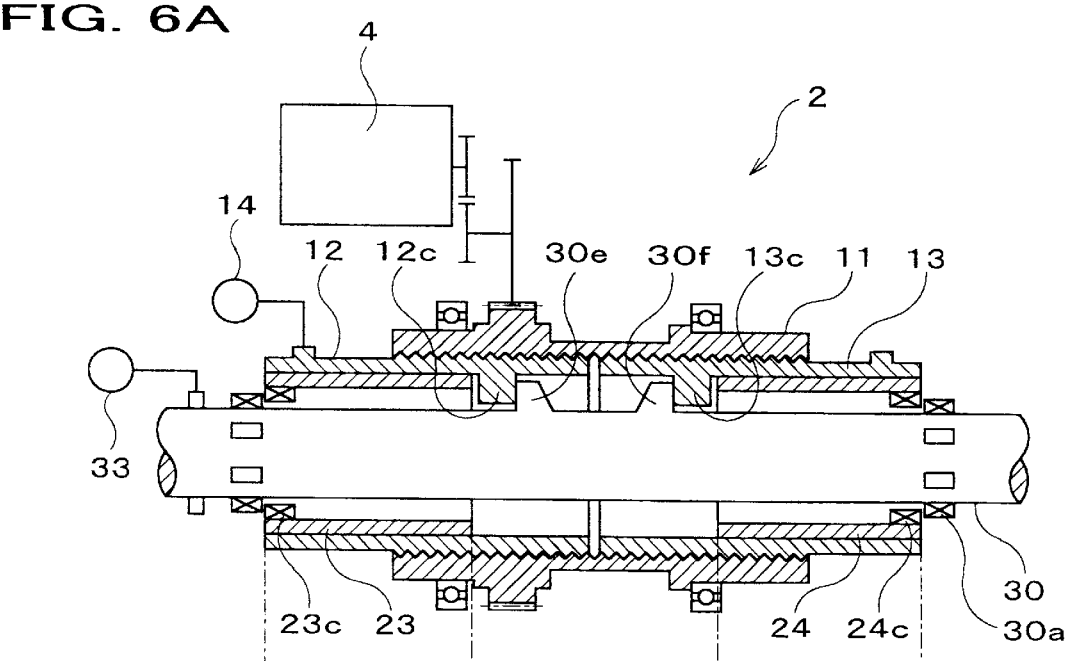
FIG. 6A is a partial sectional view of an essential part of the rear wheel steering mechanism.
Figure 6B:
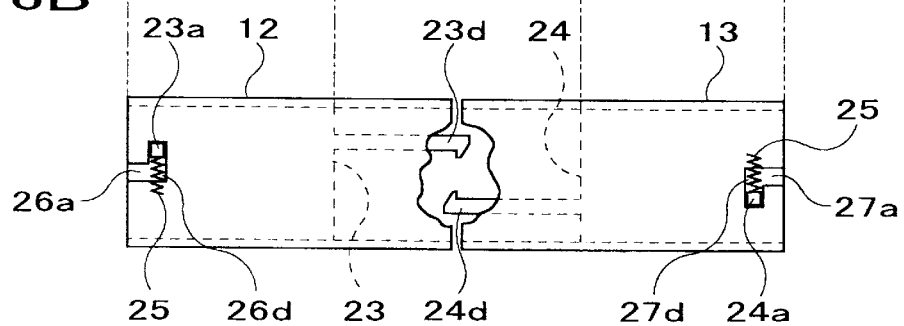
FIG. 6B is a partial front view, partly in broken away, of the left and right intermediate slide cylinders to show the engaging claws.
Figure 6C:
FIG. 6C shows guiding recesses seen from the inside of a casing.

In FIG. 6, the guide recess 26b and 27b have central, longitudinal portions 26c and 27c, respectively, which have lengths shorter than central, longitudinal portions 26d and 27d of the guide recesses 26a and 27a of the left and right intermediate slide cylinders 12 and 13. As a consequence, the clutch levers 23a and 24a of the left and right internal clutch cylinders 23 and 24 are held in right position so that they do not disengage from the guide through-recesses 26a and 27a.

When either one of the left and right electromagnet actuators 21 and 22 is actuated, either the internal clutch cylinder 23 or the internal clutch cylinder 24 corresponding to the electromagnet actuator which is actuated rotates. In this instance, the engagement claws 23d and 24d of the left and right internal clutch cylinders 23 and 24 move in close to each other but do not reach a position in which they engage with each other.

When, however, both of the electromagnet actuators 21 and 22 are actuated and both of the internal clutch cylinders 23 and 24 are simultaneously rotated, the engagement claws 23d and 24d are enable to shift to a mutual engagement position. Then, if both of the engagement claws 23d and 24d engage with each other, this action is reflected as an error steering operation of the rear wheels due to simultaneous excitation of both of the electromagnet actuators 21 and 22, and both of the internal clutch cylinders 23 and 24 are prevented from protruding outward due to engagement of the engagement claws 23d and 24d. Consequently, when both of the electromagnet actuators 21 and 22 are simultaneously excited, the rear wheels WL and WR are not steered and maintained in their straight cruising direction.

Figure 7:
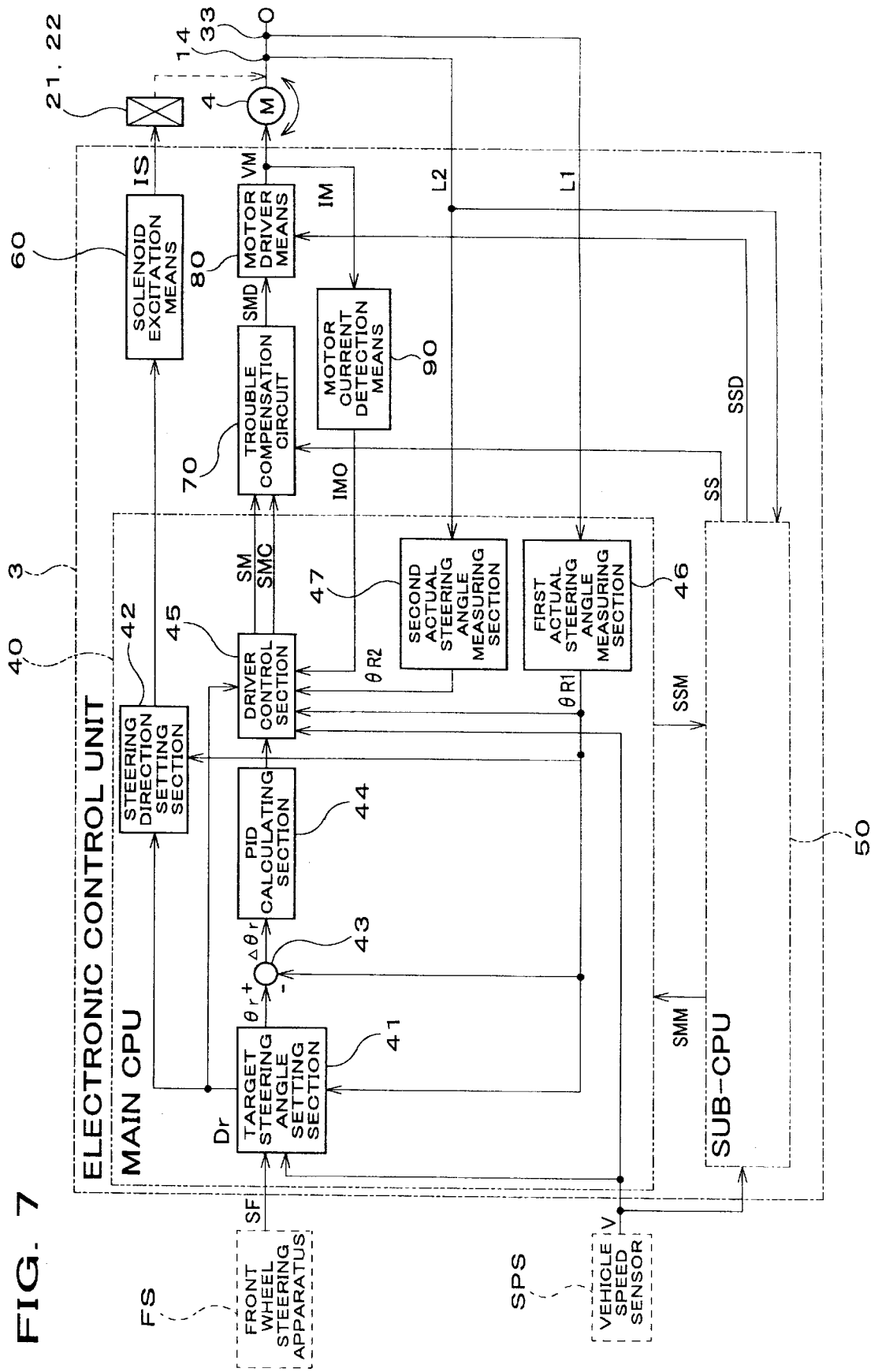
FIG. 7 is a block diagram of an electronic control unit of the rear wheel steering apparatus of FIG. 1.

Now, the electronic control unit 3 will be described in detail below with reference to FIG. 7. The electronic control unit 3 comprises a main CPU 40, a sub-CPU 50, a solenoid excitation means 60, a trouble compensation circuit 70, a motor driver means 80 and a motor current detecting means 90. The electronic control unit 3 is designed to cause the main CPU 40 to settle a target steering angle signal ΘR and a steering direction signal Dr on the basis of the front wheel steering information signal SF delivered from the front wheel steering apparatus FS and the vehicle speed signal V delivered from a vehicle speed sensor SPS. In the electronic circuit 3, also, the main CPU 40 is responsive to the target steering angle signal Θr and the steering direction signal Dr for thereby controlling the electric motor 4 and the left and right electromagnet actuators 21 and 22 by means of a main FET (Field Effect Transistor). Further, the motor driver means 80 has a main FET, which, when trouble takes place, the electronic control unit 3 controls the electric motor 4 through the sub-CPU 50 providing a sub-FET control. In case where at least one of the main CPU 40 and the sub-CPU 50 is brought into trouble, the electronic control unit 3 enables the trouble compensation circuit 70 to provide a main FET control for reverse rotation for thereby controlling the electric motor 4. In this instance, both of the main CPU 40 and the sub-CPU 50 continuously watch one another and a mutual communication is performed therebetween. It is to be noted that, in the preferred embodiment of the present invention, the terms "main CPU" 40 and "sub-CPU" 50 are used which correspond to the term "control means" defined in the scope of the claims, while the term "trouble compensation circuit" 70 correspond to the "trouble compensation circuit" in the scope of claims.

Next, the main CPU 40 will be described in detail with reference to FIG. 7. The main CPU 40 includes a target steering angle setting section 41, a steering direction setting section 42, a subtracting section 43, a PID calculating section 44, a driver control section 45, a first actual steering angle measuring section 46, and a second actual steering angle measuring section 47. With this constitution, the main CPU 40 serves to effect a main FET control for a main FET circuit 80a (see FIG. 9) of the motor driver means 80 to control the electric motor 4 and also to control the left and right electromagnet actuators 21 and 22. In this case, the main FET control is achieved by the logical judgment carried out by the trouble compensation circuit 70. To this end, the main CPU 40 outputs a motor control signal SMC to the trouble compensation circuit 70 and to set the information of the steering direction signal Dr in its internal storing register. In addition, the main CPU 40 serves to watch the sub-CPU 50 and to transmit a sub-CPU watching signal SSM to the sub-CPU 50. Further, the main CPU 40 has a watch dog timer to perform a self-watching function, by which the main CPU 40 judges the self-trouble in response to the main CPU watching signal SMM delivered from the sub-CPU 50, thereby transmitting a main signal SM to the trouble compensation circuit 70.

The target steering angle setting section 41 is supplied with the front wheel steering information signal SF from the front wheel steering apparatus FS, the vehicle speed signal V from the vehicle speed sensor SPS, and the first actual steering angle Θr1 delivered from the first actual steering angle measuring section 46, thereby setting the target steering angle Θr and the steering direction Dr of the rear wheels WL and WR as well as the control mode. The target steering angle setting section 41 sets the target steering angle Θr of the rear wheel WL and WR in response to the front wheel steering angle contained in the front wheel steering information SF and the vehicle speed signal V. Furthermore, the target steering angle setting section 41 sets the steering direction Dr and the control mode in response to the target steering angle Θr, the steering direction of the front wheel and the first actual steering angle ΘR1. In this connection, the first actual steering angle ΘR1 has a positive or negative value, with this symbol indicating information of actual steering direction of the rear wheels WL and WR. In the meantime, the vehicle speed sensor SPS serves as a sensor specific for the rear wheel steering apparatus 1 and may utilize a vehicle speed sensor of another system. The vehicle speed signal V of the vehicle speed sensor SPS comprises a number of pulses per unit time, by which the main CPU 40 calculates the vehicle speed. In this respect, the vehicle speed information may not be derived from the vehicle speed sensor SPS but may be derived from information contained in the front wheel steering information SF delivered from the front wheel steering apparatus SF.

The steering direction setting section 42 serves to set the steering direction signal Dr set by the target steering angle setting section 41 to an internal register.

The subtracting unit 43 serves to subtract the first actual steering angle ΘR1 calculated by the first actual steering angle measuring section 46 from the target steering angle Θr set by the target steering angle setting section 41, thereby calculating the steering error ΔΘr for actually enabling the steering of the rear wheels WL and WR.

The PID calculating section 44 serves to calculate a proportional expression term, an integral term and a differential term from the steering angle error ΔΘr calculated by the subtracting section 43. These parameters such as the proportional expression term have values in dependence on the steering angle error ΔΘr. Also, various calculation coefficients have values determined in dependence on the structural characteristics of the rear wheel steering mechanism 2 and it may be possible to utilize other values such as the mean value of statistical data preliminarily given by various operating tests.

The driver control section 45 determines the target motor current to be delivered to the electric motor 4 in accordance with the magnitude of the steering angle error ΔΘr in dependence on the proportional expression term, the integral term and the differential term of the steering angle error ΔΘr calculated by the PID calculating section 44. In addition, the driver control section 45 produces a PWM (Pulse Width Modulation) signal VPWM, an ON signal VON, an OFF signal VOF, a Relay-ON signal RON and a Relay-OFF signal ROF in response to the target motor current, the steering angle error ΔΘr, the electric current signal IMO delivered from the motor current detecting means 90 and the steering direction signal Dr delivered from the target steering angle setting section 41. Also, the motor control signal SMC is constituted by the PWM signal VPWM, the ON signal VON, the OFF signal VOF, the Relay-ON signal RON and the Relay-OFF signal ROF. The various signal contents of the motor control signal SMC are logically judged by the trouble compensation circuit 70 and transmitted to the motor driver means 80 as the main motor drive signal SMD. Further, it should be noted that the motor control signal SMC is used to control the main FET circuit 80a of the motor driver means 80. More specifically, a main relay 81 and relays 86 and 87 for forward rotation are supplied with the Relay-ON signal RON or the Relay-OFF signal ROF, while main FETs 82 and 84 are supplied with the PWM signal VPWM or the OFF signal VOF, and main FETs 83 and 85 are supplied with the ON signal VON or the OFF signal VOF (see FIG. 9).

When the rear wheel steering apparatus 1 is operating in its normal condition, the driver control section 45 generates the Relay-ON signal RON. Namely, the driver control section 45 transmits the Relay-ON signal RON to a coil of the main relay 81 of the motor driver means 80, thereby turning on the main relay 81 (see FIG. 9). Further, the driver control section 45 transmits the Relay-ON signals RON to the relays 86 and 87 for forward rotation, thereby turning on the relays 86 and 87 (see FIG. 9). It is to be noted here that the transmission of the Relay-ON signal RON is meant by the application of the coil current to the various relays whereas the transmission of the Relay-OFF signal ROF is meant by non-application of the coil current to the various relays.

Figure 9:
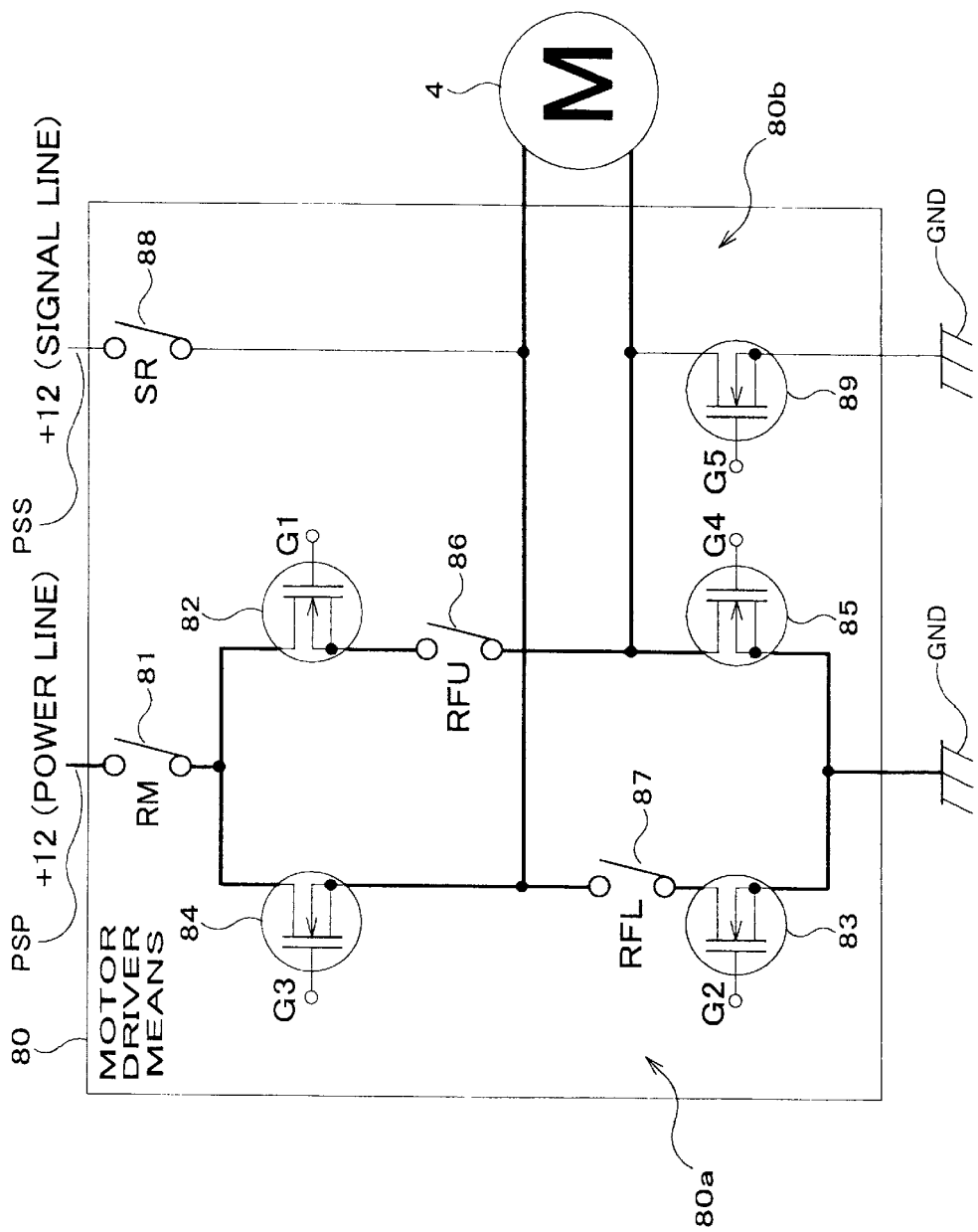
FIG. 9 is a circuit diagram of an electric motor driver means of the electronic control unit of FIG. 7.

In addition, the driver control section 45 serves to deliver the PWM signal VPWM to a gate terminal G1 of the main FET 82 or a gate terminal G3 of the main FET 84, for thereby driving the main FET 82 or the main FET 84 by PWM operation (see FIG. 9). Also, the PWM signal VPWM is applied to either one of the gate terminals G1 or G3 in dependence on the the steering direction Dr and the steering angle error $\Delta\Theta r$. Namely, the driver control section 45 serves to judge whether the steering angle of the rear wheels WL and WR is increased or decreased, in accordance with the steering direction Dr and the steering angle error $\Delta\Theta r$. In addition, the driver control section 45 operates in such a manner that, when it is required to increase the steering angle, the PWM signal VPWM is applied to the gate terminal G1 in order to drive the electric motor 4 in its forward direction (viz., in a direction to move the intermediate slide cylinders 12 and 13 away from each other), whereas, when it is required to decrease the steering angle, the PWM signal VPWM is applied to the gate terminal G3 in order to drive the electric motor 4 in its reverse direction (viz., in a direction to move the intermediate slide cylinders 12 and 13 in close to each other). Furthermore, the driver control section 45 delivers the ON signal VON to the gate terminal G2 of the main FET 83 to turn on the main FET 83 when the PWM signal VPWM is delivered to the gate terminal G3. Likewise, the driver control section 45 delivers the ON signal VON to the gate terminal G4 of the main FET 85 to turn on the main FET 85 when the PWM signal VPWM is applied to the gate terminal G3. Further, the driver control section 45 operates such that it delivers the OFF signal VOF to either one of the gate terminals G1 or G3 which is not required to deliver the PWM signal VPWM whereby the main FET 82 or the main FET are turned off. In addition, the driver control section 45 delivers the OFF signal VOF to the gate terminal G2 of the main FET 83 to turn off the main FET 83 in a case where the main FET 82 is turned off, whereas, in a case where the main FET 84 is turned off, the OFF signal VOF is applied to the gate terminal G4 of the main FET 85 to turn on the main FET 85. As a consequence, the steering shaft 30 of the rear wheel steering mechanism 2 is moved in left and right directions or restored to its neutral position in accordance with the forward or reverse rotations of the electric motor 4, so that the rear wheels WL and WR are steered to left or right directions, or restored to its straight cruising direction.

When at least one of the main FETs 82, 83, 84 and 85 of the electric motor driver means 80 becomes defected during normal operating condition in the system of the rear wheel steering apparatus 1, the driver control section 45 instantaneously generates the Relay-OFF signal ROF. Namely, the driver control section 45 delivers the Relay-OFF signal ROF to the coil of the main relay 81 of the electric motor driver means 80 to turn off the main relay 81, for thereby stopping the rotation of the electric motor 4 (see FIG. 9). In this instance, also, double safety measures may be performed by the Relay-Off signal ROF to the relays 86 and 87 for the forward rotation, thereby turning off the relays 86 and 87.

Further, when at least one of the drive stroke sensor 14 and the steering stroke sensor 33 is defected during normal operating conditions in the system of the rear wheel steering apparatus 1, the driver control section 45 initially produces the On signal VON, the Relay-ON signal RON and the Relay-OFF signal ROF. Namely, the driver control section 45 delivers the ON signal VON to the gate terminals G3 and G4 of the main FETs 84 and 85, respectively, thereby turning on the main FETs 84 and 85 (viz., which are driven by PWM signals of 100% duty ratio) (see FIG. 9). In this instance, further, the OFF signal VOF is applied to the gate terminals G1 and G2 of the main FETs 82 and 83. In addition, the driver control section 45 delivers the Relay-OFF signals ROF to the coils of the relays 86 and 87 for the forward rotation of the electric motor driver means 80, as the double safety measures, thereby turning off the relays 86 and 87 for the forward rotation. Also, in this case, the relays 86 and 87 for forward drive may be maintained in the turned on state. Since, in this instance, the electric motor 4 is rotated in the reverse direction, the rear wheel steering mechanism 2 is returned to the neutral position for thereby restoring the rear wheels in the straight cruising direction. Subsequently, after the neutral position has been judged by the driver control section 45, it delivers the Relay-OFF signals ROF to the coil of the electric motor driver means 80, thereby turning off the main relay 81 (see FIG. 9). In this instance, the judgment of the neutral position is performed in response to the first actual steering angle $\Delta\Theta R1$ from the first actual steering angle measuring section 46 or the second actual steering angle $\Theta R2$ from the second actual steering measuring section 47 and the electric motor current signal IMO. For example, the driver control section 45 makes a judgment of the neutral position when the first actual steering angle $\Theta R1$ is within a range of $\pm 1°$ indicative of the neutral position or when the second actual steering angle $\Theta R2$ is within a range of $\pm 1°$ indicative of the neutral position while the electric motor current signal IMO increases beyond a value of 30A. Namely, while either one of the drive stroke sensor 14 and the steering stroke sensor 33 is defected, the other stroke sensor detects a precise stroke distance and, thus, either one of the first actual steering angle $\Theta R1$ and the second actual steering angle $\Theta R2$ is at correct value. Accordingly, one of the first actual steering angle $\Theta R1$ and the second actual steering angle $\Theta R2$ surely shows a value indicative of the neutral position. In order to further increase the accuracy in judgment of the neutral position, additional judgment conditions are settled in that the electric motor current signal IMS reaches beyond 30A in order to add conditions where the electric motor 4 is driven in the reverse direction in response to the drive pulses each having a duty ratio of 100% and the electric motor 4 is halted at the neutral position. Namely, when the electric motor 4 is supplied with the motor drive voltage VM and is rotated, a reverse electromotive force is generated. For this reason, the motor current is reduced by an amount equal to the reverse electromotive force, so that the electric current of the electric motor 4 decreases below 30A even when the electric motor 4 is supplied with the drive pulses having the duty ratio of 100%. If, however, the rear wheel steering mechanism 2 is restored to its neutral position, the rotation of the electric motor 4 is stopped whereby the electromotive force is not generated. Accordingly, if the rear wheel steering mechanism 2 restores its neutral position, the motor current IM will be nearly proportional to the motor voltage VM and, thus, the motor current signal IMO reaches beyond 30A.

Moreover, the main CPU 40 serves to generate a main signal SM indicative of either normal or defected condition of the main CPU 40. The main CPU 40 also generates a main signal MS due to its internal watch dog timer function in response to internal information such as the main CPU watching information. Further, the main signal SM shows a "H" signal when the main CPU 40 is in its normal operating condition and "L" signal when the main CPU 40 is in defected condition. Furthermore, the main signal SM serves to watch the operation of the sub CPU 50 in order to deliver the sub CPU watching information SSM to the sub CPU 50. In addition, the main CPU 40 also compares the vehicle speed and the actual steering angle calculated by the sub CPU 50 with the corresponding vehicle speed and actual steering angle calculated by the main CPU 40, thereby watching the sub CPU 50.

The first actual steering angle measuring section 46 is applied with the stroke distance signal L1 from the steering stroke sensor 33 and serves to convert the stroke distance L1 into the first actual steering angle ΘR1 indicative of an actual steering angle of the rear wheels WL and WR. Since, in this instance, the steering stroke sensor 33 is able to detect the moving direction of the steering shaft 30, the first actual steering angle ΘR1 includes a positive value assigned for a leftward stroke distance for the neutral position and a negative value assigned for a rightward stroke distance from the neutral position.

The second actual steering angle measuring section 47 is applied with the stroke distance signal L2 delivered from the drive stroke sensor 14 for converting the stroke distance signal L2 into the second actual steering angle signal ΘR2. Since, also, the drive stroke sensor 14 can not detect the direction of the movement of the steering shaft 30, the second actual steering angle signal ΘR2 is determined independently of the moving direction of the steering shaft 30 and assigned to have a positive value.

Next, the sub CPU 50 will be discussed below with reference to FIG. 7. The sub CPU 50 serves to control a sub-FET circuit 80b of the motor driver means 80 in order to control the electric motor 4 when at least one of the main FETs 82, 83, 84 and 85 of the motor driver means 80 becomes defected. To this end, the sub-CPU 50 generates a sub-motor drive signal SSD. The sub-CPU 54 operates in such a manner that, when at least one of the main FETs 82, 83, 84 and 85 becomes defected, it delivers the Relay-ON signal RON to a sub-relay 88 while applying the PWM signal VPWM to the gate terminal G5 of the sub-FET 89. Also, it is to be noted that the sub electric motor drive signal SSD is comprised of the Relay-ON signal RON (or the Relay-OFF signal) and the PWM signal VPWM (or the OFF signal VOF). Namely, the sub-CPU 50 delivers the Relay-ON signal RON to the coil of the sub-relay 88 of the electric motor driver means 80, thereby turning on the sub relay 88 (see FIG. 9). Further, the sub-CPU 50 serves to deliver the PWM signal VPWM to the gate terminal GS of the sub-FET 89 of the motor driver means 80, thereby driving the sub-FET 89 with PWM operation (see FIG. 9). Also, the sub-CPU 50 generates a PWM signal VPWM of a low duty ratio of 30% in order to restrict the amount of the motor current IM. For this reason, the electric motor 4 has the motor current IM of about 10 A. In this instance, since the electric motor 4 is rotated in the reverse direction, the rear wheel steering mechanism 2 is returned to its neutral position, thereby restoring the rear wheels WL and WR in the straight cruising direction. In addition, if the rear wheel steering mechanism 2 makes a judgment in which it is restored in its neutral position, the rear wheel steering mechanism 2 delivers the Relay-OFF signal ROF to the sub-lay 88, thereby halting the reverse rotation of the electric motor 4 by turning off the sub-ET circuit 80b. It is to be noted that the judgment of the neutral position is made in dependence on the second actual steering angle. For example, the sub-CPU 50 makes the judgment that it is a neutral position when the second actual steering angle reaches a value within an angle of ±1° representative of the neutral position. In this connection, the sub-CPU 50 is applied with the travel distance signal L2 from the driver stroke sensor 14 to calculate the actual steering angle. Further, the sub-CPU 50 is also supplied with the vehicle speed sensor V from the vehicle speed sensor SPS to restrict the vehicle speed. As a result, the rear wheels WL and WR do not move due to static friction with the road surface under a predetermined vehicle speed. Accordingly, the sub-CPU 50 does not generate Relay-ON signal RON and the PWM signal VPWM if the vehicle speed is less than, for example, 2 Km/h, so that the sub-FET 89 is not driven with the PWM operation. In this respect, it is to be noted that the vehicle speed signal V of the vehicle speed sensor SPS is represented by the number of pulses per unit time and the sub-CPU 50 serves to perform calculation from the number of these pulses. In this connection, when all of the main FETs 82, 83, 84 and 85 are operating under normal condition, the sub CPU 50 generates the Relay-OFF signal ROF which is applied to the sub relay 88.

Further, sub-CPU 50 serves to watch the main CPU 40 and delivers the main CPU watching information SMM thereto. The sub-CPU 50 compares the vehicle speed and actual steering angle calculated by the main CPU 40 with the vehicle speed and the actual steering angle calculated by the sub-CPU, for thereby watching the main CPU 40. Also, the sub-CPU 50 incorporates therein a self-watching function by means of watch dog timer, and judges the self-malfunction in dependence on the CPU watching information SSM delivered from the main CPU 40 for delivering the sub-signal SS to the trouble compensation circuit 70. In this instance, the sub-signal SS has positive (H) and negative (L) values when the sub-CPU50 is in normal operating condition and in trouble condition, respectively.

Next, the solenoid excitation means 60 is described with reference to FIG. 7. The solenoid excitation means 60 serves to select one of the left and right electromagnet actuators 21 and 22 for thereby exciting the selected solenoid in dependence on the steering direction signal Dr set in the internal register of the steering angle direction setting section 42. As a result, the solenoid excitation 60 actuates the movable pins of the left and right electromagnet actuator 21 and 22. Also, in this case, the solenoid excitation means 60 delivers the solenoid current IS only when the steering shaft 30 is maintained nearly in its neutral position. To this end, the steering direction setting section 42 is supplied with the first actual steering angle ΘR1 to judge the neutral position.

Figure 8:
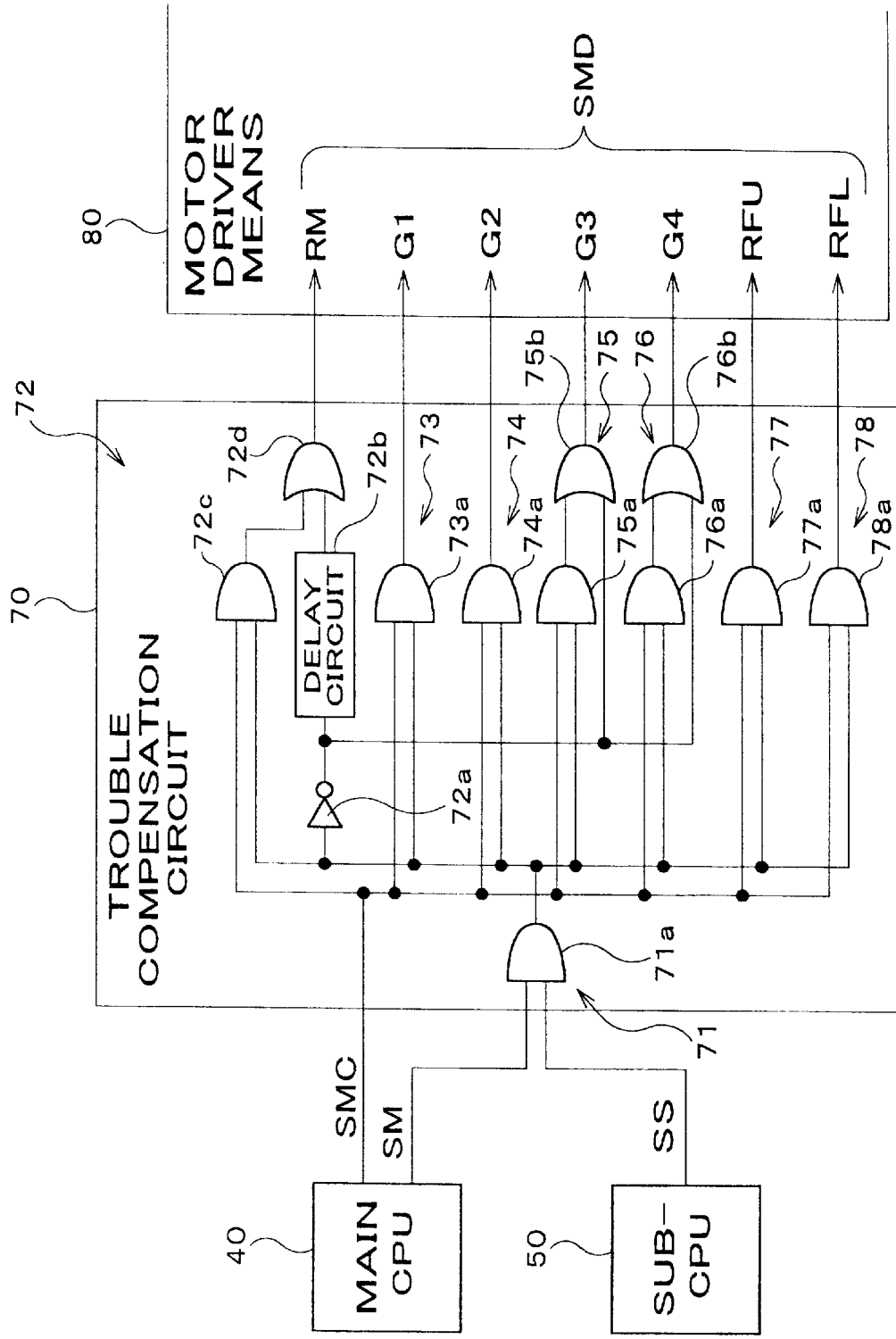
FIG. 8 is a logic circuit diagram of a trouble compensation circuit of the electronic control unit of FIG. 7.

Turning now to FIGS. 8 and 9, the trouble compensation circuit 70 is shown. The trouble compensation circuit 70 is comprised of a trouble judging section 71, a main relay control section 72, an upper stage, forward rotation FET driver section 73, a lower stage, forward rotation FET driver section 74, an upper stage, reverse rotation FET driver section 75, a lower stage, reverse rotation FET driver section 76, an upper stage, forward rotation relay control section 77 and a lower stage, forward rotation relay control means 78. The trouble compensation circuit 70 is supplied with the main signal SM and the electric motor control signal SMC delivered from the main CPU 40 and the sub signal SS from the sub-CPU 50 to deliver the main electric motor drive signal SMD to the electric motor driver means 80 for thereby controlling the main FET circuit 80a of the electric motor driver means 80 (see FIG. 9). The trouble compensation circuit 70 serves to turn on the reverse rotation main FET 84, and 85 of the main FET circuit 80a of the electric motor driver means 80 for a certain time interval, when the control means composed of main CPU 40 and the sub-CPU 50 becomes defected, enabling the rear wheel steering mechanism 2 to its neutral position whereby the rear wheels WL and WR are restored in its straight cruising direction. Also, in a case where the control means composed of the main CPU 40 and the sub CPU 50 is operating under normal condition, the trouble compensation circuit 70 serves to deliver the electric motor control signal SMC from the main CPU 40 as the electric motor drive signal SMD. To this end, the trouble compensation circuit 70 is composed of an analog circuit independently of the main CPU 40 and the sub-CPU 50 such that the trouble compensation circuit 70 is not affected by the control of the main CPU 40 and the sub-CPU 50.

It is to be noted that, in the following logic judgment, the PWM signal VPWM, the ON signal VON, the OFF signal VOF, the Relay-ON signal RON and Relay-OFF signal ROF are assigned H/L signal, H signal, L signal, H signal and L signal, respectively.

The trouble judgment section 71 serves to achieve judgment whether at least one of the main CPU 40 and the sub-CPU 50 is in defected condition, in response to the main signal SM and the sub signal SS. To this end, the trouble judgment section 71 comprises an AND circuit 71a. The AND circuit 71a is supplied with the main signal SM and the sub signal SS to produce a H signal and L signal independence thereon. More specifically, in a case where both of the main signal SM and the sub-signal SS are H signals (,viz., when both of the main CPU 40 and the sub-CPU 50 are operating under normal operating condition), the AND circuit 71a produces the H signal. On the other hand, in a case where at least one of the main signal SM and the sub-signal SS is L signal (, viz., when at least one of the main CPU 40 and the sub-CPU 50 is defected), the AND circuit 71a produces the L signal. Consequently, in a case where the output signal of the AND circuit 71a is the H signal, both of the main CPU 40 and the sub-CPU 50 are operating under the normal condition, whereas, when the output signal of the AND circuit 71a is the L signal, at least one of the main CPU 40 and the sub-CPU 50 is reflected by the trouble or defected condition.

The main relay control section 72 serves to control the main relay 81 so as to turn on or turn off the same in dependence on the output signal from the AND circuit 71a and the content of the motor control signal SMC. More particularly, the main relay control section 72 turns off the main relay 81 after a certain time interval when at least one of the main CPU 40 and the sub-CPU 50 becomes defected, for thereby disenabling the supply of the power supply voltage PSP to the main FET circuit 80a (viz., the main FET circuit 80a is supplied with the power supply voltage PSP of 12 V for the certain time interval) (see FIG. 9). To this end, the main relay control section 72 includes an inversion circuit 72a, a delay circuit 72b, an AND circuit 72c and an OR circuit 72d. The inversion circuit 72a receives the H/L signal from the AND circuit 71a and invert that signal to produce the H signal and the L signal. In this instance, the delay circuit 72b is applied with the H/L signal from the inversion circuit 72a to produce the Relay-ON signal RON and the relay OFF signal ROF. Also, the delay circuit 72b responds to the H signal which triggers a timer. The AND circuit 72c is applied with the H/L signal from the AND circuit 71a and the motor control signal SMC to produce the Relay-ON signal RON or the Relay-OFF signal ROF signal. The OR circuit 72d is supplied with the output signals from the AND circuit 72c and the delay circuit 72b to produce the Relay-ON signal RON or the Relay-OFF signal ROF. More specifically, in a case where the output of the AND circuit 71a is the H signal (, viz., when the main CPU 40 and the sub-CPU 50 are operating under normal condition), since the inversion circuit 72a produces the L signal, the delay circuit 72b produces the Relay-OFF signal ROF at all times while disenabling the triggering of the timer. In this instance, since the output of the AND circuit 71a is the H signal, the AND circuit 72c passes the signal SMC to the main relay 81 via the OR circuit 72d.

Further, since the output of the delay circuit 72b is the Relay-OFF signal ROF, the OR circuit 72d allows to pass the output (viz., one of various signal contents of the motor control signal SMC) of the AND circuit 72c to the main relay 81. On the other hand, in a case where the output of the AND circuit 71a is the L signal (, viz., when at least one of the main CPU 40 and the sub-CPU 50 becomes defected), the inversion circuit 72a produces the H signal. In this instance, the delay circuit 72b is applied with the H signal from the inversion circuit 72a and simultaneously produces the Relay-ON signal RON, thereby triggering the timer in response to the H signal. Further, the delay circuit 72b produces the Relay-OFF signal ROF after the certain time interval (,for example, 10 seconds,) has passed in the timer. In this manner, the delay circuit 72b causes the OR circuit 72d to produce the Relay-ON signal RON for the given time interval when at least one of the main CPU 40 and the sub-CPU 50 becomes defected and, thereafter, produces the Relay-OFF signal ROF. In this instance, the given time interval should be determined to have a value sufficient for keeping the ON state of the reverse rotation FETs 84 and 85 to thereby restore the rear wheel steering mechanism 2 to its neutral position even in a case where the steering shaft 30 is moved to its maximum outermost position. During this time interval, since the output of the AND circuit 71a is the L signal, the AND circuit 72c produces the Relay-OFF signal ROF even in a case in which the main CPU 40 is caused to malfunction and the motor control signal SMC is unstable. At this time instant, the OR circuit 72d delivers the main relay drive signal RM to the main relay 81 (see FIG. 9) in response to the output signal from the delay circuit 72b. It is to be noted, in this instance, that the delay circuit 72b may be dispensed with and, instead thereof, the second actual steering angle signal ΘR2 is introduced to the comparing circuit from the second actual steering angle measuring section 47 such that the comparing circuit produces the H signal until the second actual steering angle signal ΘR2 reaches a value of ±1° corresponding to an angle of the neutral position and produces the L signal which is transmitted to the OR circuit 72d when the above steering signal reaches the value of ±1°.

An upper stage forward rotation FET driver 73 serves to drive the main FET 82 in PWM operation or to turn off the same in dependence on the output signal of the AND circuit 71a and the motor control signal SMC. To this end, the upper stage forward rotation FET driver 73 includes an AND circuit 73a. The AND circuit 73a is applied with the output signal from the AND circuit 71a and the motor control signal SMC to produce the PWM signal VPWM or the OFF signal VOF. Namely, in this instance, if the output of the AND circuit 71a is the H signal, (viz., when the both of the main CPU 40 and the sub CPU 50 are in a normal condition), the AND circuit 73a passes the PWM signal VPWM or the Off signal VOF of the motor control signal SMC to the gate G1 of the upper stage forward rotation main FET 82. On the other hand, when the output of the AND gate 71a is the L signal, (viz., when at least one of the main CPU 40 and the sub-CPU 50 is defected), the AND circuit 73a passes the OFF signal VOF of the motor control signal SMC to the gate G1 of the upper stage forward rotation main FET 82. The lower stage forward FET driver 74 serves to turn on or turn off a lower stage forward rotation main FET 83 independence on the output from the AND circuit 71a and the content of the motor control signal SMC. To this end, the lower stage forward rotation FET driver 74 includes an AND circuit 74a. The AND circuit 74a is applied with the H/L signal from the AND circuit 71a and the content (viz., the ON signal VON or the OFF signal VOF) of the motor control signal SMC, to thereby deliver the ON signal VON or the OFF signal VOF. More specifically, in a case where the output of the AND circuit 71a is the H signal (viz., when the both of the main CPU 40 and the sub-CPU 50 are in a normal condition), the AND circuit 74a delivers the ON signal VON or the OFF signal VOF of the motor control signal SMC to the gate G2. On the other hand, if the output of the AND circuit 71a is the L signal (viz., when at least one of the main CPU 40 and the sub-CPU 50 is defected), the AND circuit 74a passes the off signal VOF of the motor control signal SMC to the gate G2.

An upper stage reverse rotation driver 75 serves to drive the Upper stage reverse rotation main FET 84 in PWM operation, turn on or turn off the same in dependence on the output signal from the AND Circuit 71a, the output signal from the inversion circuit 72a and the content of the motor control signal SMC. Especially, the upper stage reverse rotation FET driver 75 turns on the upper stage reverse rotation main FET 84 in a case in which at least one of the main CPU 40 and the sub-CPU 50 is defected. Also, in a case where at least one of the main CPU 40 and the sub-CPU 50 is defected, the main relay control section 72 supplies the power supply voltage PSP of 12 V to the main FET circuit 80a for a certain time interval, so that the upper stage reverse rotation main FET 84 is turned on for that time interval. To this end, the upper stage reverse rotation FET driver 75 includes an AND circuit 75a and an OR circuit 75b. The AND circuit 75a is applied with the H/L signal from the AND circuit 71a and the motor control signal SMC composed of various signals (viz., the PWM signal VPWM or the OFF signal VOF) to produce the PWM signal VPWM and the OFF signal VOF. The OR circuit 75b is applied with the H/L signal from the inversion circuit 72a and the PWM signal VPWM or the OFF signal VOF, to produce a PWM signal VPWM, an ON signal VON or an OFF signal VOF. Accordingly, in a case in which the output of the AND circuit is the H signal (viz., when both of the main CPU 40 and the sub-CPU 50 are operating under normal condition), the output of the AND circuit 71a is the H signal and, so, the AND circuit 75a passes the content of the motor control signal SMC to the upper stage reverse rotation main FET 84. In this instance, further, since the output of the inversion circuit 72a is the L signal, the OR circuit 75b passes the output (viz., the content of the motor control signal SMC for the upper stage reverse rotation main FET 84) of the AND circuit 75a to the gate G3 of the upper stage reverse rotation main FET 84. On the other hand, in a case where the output of the AND circuit 71a is the L signal (viz., at least one of the main CPU 40 and the sub-CPU 50 is defected), since the output of the inversion circuit 72a is the H signal, the OR circuit 75b transmits the ON signal VON to the gate G3 of the upper stage reverse rotation main FET 84.

A lower stage reverse rotation FET driver 76 serves to turn on or turn off the lower reverse rotation main FET 85 in dependence on the output of the AND circuit 71a, the output of the inversion circuit 72a and the various signal content of the motor control signal SMC. Especially, the lower stage reverse rotation FET driver 76 turns on the lower stage reverse rotation main FET 85 in a case in which at least one of the main CPU 40 and the sub-CPU 50 is defected. Also, in a case in which the trouble takes place in at least one of the main CPU 40 and the sub-CPU 50, since the main FET 80a is supplied with the power supply voltage PSP of 12 V by the main relay control section 72 for a given time interval, the lower stage reverse rotation main FET 85 is turned on for that time interval. To this end, the lower stage reverse rotation FET driver 76 includes AND circuit 76a and an OR circuit 76b. The AND circuit 76a is applied with the H/L signal from the AND circuit 71a and the motor control signal SMC having the various signal contents (viz., the ON signal VON or the OFF signal VOF) to produce the ON signal VON or the OFF signal VOF. The OR circuit 76b is applied with the H/L signal from the inversion circuit 72a and the ON signal VON or the OFF signal VOF from the AND circuit 75a, to produce the ON signal VON or the OFF signal VOF. Namely, if the output of the AND circuit 71a is the H signal (viz., when both of the main CPU 40 and the sub-CPU 50 are in the normal operating condition), the AND circuit 76a passes the content of the motor control signal SMC to the lower stage reverse rotation main FET 85 due to the H signal applied from the AND circuit 71a. Further, since the output of the inversion circuit 72a is the L signal, the OR circuit 76b produces the output (viz., the content of the motor control signal SMC) of the AND circuit 76a, which is applied to the gate G4 of the lower stage reverse rotation main FET 85. On the other hand, in a case in which the output of the AND circuit 71a is the L signal (viz., when at least one of the main CPU 40 and the sub-CPU 50 is defected), the OR circuit 76b delivers the ON signal VON to the gate G4 of the lower stage reverse rotation main FET 85 due to the H signal of the inversion circuit 72a.

An upper forward rotation relay control section 77 serves to turn on or turn off the upper stage forward rotation relay 86 in dependence on the output of the AND circuit 71a and the motor control signal SMC having the various signal contents to be applied to the upper stage forward rotation relay 86. To this end, the upper stage forward rotation relay control section 77 includes an AND circuit 77a. The AND circuit 77a is applied with the H/L signal from the AND circuit 71a and the motor control signal SMC having the various signals (viz., the Relay-ON signal RON or the Relay-OFF signal ROF), to produce the Relay-ON signal RON or the Relay-OFF signal ROF. Namely, in a case in which the output of the AND circuit 71a is the H signal (viz., when both of the main CPU 40 and the sub-CPU are operating in the normal condition), the AND circuit 77a delivers the same Relay-ON signal RON or the Relay-OFF signal ROF as the motor control signal SMC to the upper stage forward rotation relay 86. On the other hand, if the output of the AND circuit 71a is the L signal (viz., when at least one of the main CPU 40 and the sub-CPU 50 is defected), the AND circuit 77a passes the Relay-OFF signal ROF to the upper stage forward rotation relay 86.

A lower stage forward rotation relay control section 78 serves to turn on or turn off the lower stage forward rotation relay 87 in dependence on the output from the AND circuit 71a and the motor control signal having the various signal contents intended to be applied to the lower stage forward rotation relay 87. To this end, the lower stage forward drive relay control section 78 includes an AND circuit 78a. The AND circuit 78a is applied with the H/L signal from the AND circuit 71a and the motor control signal SMC composed of various signal contents (viz., the Relay-ON signal RON or the Relay-OFF signal ROF) related to the lower stage forward rotation relay 87. More specifically, if the output of the AND circuit 71a is the H signal (viz., when both of the main CPU 40 and the sub CPU 50 are operating in the normal condition), the AND circuit 78a passes the Relay-ON signal RON or the Relay-OFF signal ROF of the motor control signal SMC to the lower stage forward rotation relay 87. On the other hand, if the output of the AND circuit 71a is the L signal (viz., when at least one of the main CPU 40 and the sub CPU 50 is defected), the AND circuit 78a passes the Relay-OFF signal ROF to the lower stage forward rotation relay 87.

In addition, it is to be noted that the main motor drive signal SMD is comprised of various signals produced by the main relay control section 72, the upper stage forward rotation FET driver 73, the lower stage forward rotation FET driver 74, the upper stage reverse rotation FET driver 75, the lower stage reverse rotation FET driver 76, the upper stage reverse rotation relay control section 77 and the lower stage forward rotation relay control section 78.

Next, the motor driver means 80 will be discussed in detail below with reference to FIG. 9. The motor driver means 80 comprises a main FET circuit 80a and a sub-FET circuit 80b. The main FET circuit 80a is normally controlled by the main CPU 40 and, in trouble condition, it is also controlled by the trouble compensation circuit 70 to compensate the trouble conditions of the main CPU 40 and the sub-CPU 50. To this end, the motor driver means 80 is applied with the motor drive signal SMD produced by the logical judgment of the motor control signal SMC, delivered from the main CPU 40, in the trouble compensation circuit 70.

Further, the main FET 80a serves to drive the electric motor 4 in its forward or reverse direction in response to the motor drive voltage VM produced in accordance with the motor drive signal AMD. On the other hand, the sub FET 80b is controlled by the sub CPU 50 where at least one of the main FETs 82, 83, 84 and 85 of the main FET circuit 80a. To this end, the sub-FET circuit 80b is applied with a sub motor drive signal SSD from the sub CPU 50. In addition, the sub-FET circuit 80b applies the motor drive voltage VM to the electric motor 4 in dependence on the sub-motor drive signal SSD, thereby driving the electric motor 4 in its reverse direction.

The main FET circuit 80a is composed of the main relay 81, main FETs 82, 83, 84 and 85 each constituted by a field effect power transistor, and the forward rotation relays 86 and 87. The main FET circuit 80a comprises a bridge circuit composed of the four main FETs 82, 83, 84 and 85 and connected to the power line provided with the power supply voltage PSP and the ground GND to receive the power supply voltage PSP of 12 V. The main FETs 82 and 83 serves to effect forward rotation of the electric motor 4 and drives the electric motor 4 in its forward direction when both of the FETs are turned on. On the other hand, the FETs 84 and 85 serves to effect the reverse rotation of the electric motor 4 and drives the electric motor 4 in its reverse direction when both FETs are turned on. The main relay 81 is coupled between the power supply line PSP and the bridge circuit. With this arrangement, the main relay 81 is applied with the Relay-ON signal RON or the Relay-OFF signal ROF of the main motor drive signal SMD, to enable or disenable the supply of the power supply voltage PSP of 12 V to the bridge circuit. Further, the main relay 81 is turned on when the system of the rear wheel steering apparatus 1 is operating under its normal condition, and turned off when the system trouble takes place. The main relay 81 is turned on when its coil current flows in response to the Relay-ON signal RON, thereby supplying the power supply voltage PSP of 12 V to the bridge circuit. In addition, the main relay 81 is turned off when its coil current does not flow in response to the Relay-OFF signal ROF, thereby disenabling the supply of the power supply voltage PSP of 12 V to the bridge circuit.

It is to be noted, in this instance that the main FETs 82, 83, 84 and 85 are referred to as "switching elements" in the scope of the claims.

The main FET circuit 80a is arranged such that the electric motor 4 is connected in series to a junction between the FETs 82 and 85 and also connected to a junction between the FETs 83 and 84. Further, the upper stage forward rotation relay 86 is connected between the main FET 82 and the electric motor 4, while the lower stage forward rotation relay 87 is connected between the main FET 83 and the electric motor 4. With this arrangement, each of the forward rotation relays 86 and 87 is supplied with the Relay-ON signal RON or the Relay-OFF signal ROF of the main motor drive signal SMD, achieving connection or disconnection between the main FETs 82 and 83 for forward rotation with the electric motor 4. Namely, it becomes possible to surely stop the supply of the motor drive voltage VM for the forward rotation of the electric motor 4 with the use of the forward rotation relays 86 and 87. Also, these forward rotation relays 86 and 87 are turned on by the coil current flowing in response to the Relay-ON signal RON, thereby providing connection between the main forward rotation main FETs 82 and 83 and the electric motor 4. On the other hand, the forward rotation relays 86 and 87 are turned off by interruption of the coil current in response to the Relay-OFF signal ROF, thereby providing disconnection between the forward rotation main FETs 82 and 83 and the electric motor 4.

In addition, the electric motor 4 is driven in the forward direction when, in the main FET circuit 80a, the upper stage forward rotation main FET 82 has its gate G supplied with the PWM signal VPWM, the upper stage forward rotation main FET 83 has its gate G2 supplied with the ON signal VON, the reverse rotation main FETs 84 and 85 have their gates G3 and G4 supplied with Off signal VOF and the main relay 81 and the forward rotation relays 86 and 87 are supplied with the Relay-ON signal RON to apply the motor drive voltage VM to the electric motor 4 for its forward driving operation. On the other hand, the electric motor 4 is driven in the reverse direction when, in the main FET circuit 80a, the upper stage reverse rotation main FET 84 has its gate G3 supplied with the PWM signal VPWM, the lower stage reverse rotation main FET 85 has its gate G4 supplied with the ON signal VON, the forward rotation main FETs 82 and 83 have their gates G1 and G2 supplied with the OFF signal VOF and the main relay 81 and the forward rotation relays 86 and 87 are supplied with the Relay-ON signal to apply the motor drive voltage VM to the electric motor 4 for its reverse rotation. It is to be noted that the motor drive voltage VM has a value determined by the duty ratio of the PWM signal VPWM. In this instance, the motor current IM flowing through the electric motor 4 depends on the value of the motor drive voltage VM. For example, when the PWM signal VPWM has the duty ration of 70% (viz., 7 (logic level of "1"): 3 (logic level of "0")), the motor drive voltage VM has a level expressed by 12 V×(7/10)=8.4 V, which is continuously applied to the electric motor 4. Since, also, the electric motor 4 is intended to permit the electric current of maximum amount of 30A supplied through the main FET circuit 80a, the main FET circuit 80a is designed to have a large wiring pattern corresponding to the maximum motor current IM.

As already discussed above, in a case where the trouble takes place in at least one of the main CPU 40 and the sub-CPU 5, the main CPU 40 is disenabled to control the main FET, and the main FET circuit 80a is controlled by the trouble compensation circuit 70. In the main FET circuit 80a, namely, when the trouble compensation circuit 70 judges the troubles in the CPU, trouble compensation circuit 70 functions such that the main relay 81 is supplied with the Relay-ON signal RON, the forward driving relays 86 and 87 are supplied with the Relay-OFF signal ROF and the reverse driving main FETs 84 and 85 have their gates G3 and G4 supplied with the ON signal VON for thereby applying the motor drive voltage VM to the electric motor 4 for its reverse driving. Furthermore, after the certain time interval has lapsed, the main relay 81 in the main FET circuit 80a is applied with the Relay-OFF signal ROF so that the supply of the motor drive voltage VM to the electric motor 4 is completely stopped.

The sub FET circuit 80b is composed of the sub relay 88 and the sub FET 89. The sub-FET circuit 80b is connected between the power supply (a signal supply) line PSS and the ground GND and is supplied with the power supply voltage PSS of 12V. The sub relay 88 is supplied with the Relay-ON signal RON or the Relay-OFF signal ROF of the motor sub drive signal SSD, thereby stopping the supply of the power supply voltage PSP of 12V to the sub-FET 89. The sub relay 88 is turned on due to flow of coil current in response to the Relay-ON signal RON, and the sub relay 88 is supplied with the power supply voltage PSS of 12V. Further, the sub FET circuit 80b operates, in order to drive the electric motor 4 in its reverse direction, to connect the electric motor 4 to a junction between is the sub-relay 88 and the sub FET 89. The sub-FET 89 has its gate G5 adapted to be applied with the PWM signal VPWM or the OFF signal VOF of the motor drive signal SSD for thereby driving the electric motor 4 in PWM operation or turning off the same. It is to be noted, in this instance, that the power supply (power line) PSP and the power supply (signal line) PSS are branched off at a location near the battery (not shown) and have wiring of different diameters viz., the power line PSP having a large wiring while the signal line PSS has a small wiring.

In a case where at least one of the main FETs 82, 83, 84 and 85 become defected, the sub FET circuit 80b operates such that, when the vehicle speed is judged to exceed beyond a level of 2 km/h by the sub-CPU 50, the sub-relay 88 is applied with the Relay-ON signal RON and the sub-FET 89 is applied with the PWM signal VPWM to apply the motor drive voltage VM to the electric motor 4 for its reverse driving. During this time interval, since the restoring of the neutral position is carried out by the action of the sub-CPU 50 after the vehicle speed exceeds beyond a level in which a road surface reaction applied to the vehicle's tires is reduced, the PWM signal VPWM may have the duty ratio of 30% by which the electric current IM of 10 A flows in the electric motor 4. Thus, the sub FET circuit 80b may be composed of small wirings, whereby heat dissipation of control elements is achieved and the cost down of harness and couplers, etc., can be achieved. In a case where all of the main FETs 82, 83, 84 and 85, on the other hand, the sub-relay 88 of the sub FET circuit 80b is applied with the Relay-OFF signal ROF so that the electric motor 4 is not supplied with the motor drive voltage VM by the sub FET circuit 80b.

The motor current detection means 90 will now be discussed below with reference to FIG. 7. The motor current detection means 90 is composed of an electric resistor connected in series with the electric motor 4 or a hole-effect element, etc., to detect the amount of and direction of the motor current IM actually flowing through the electric motor 4. In addition, the motor current detection means 90 is arranged to feed back the a motor current signal IMO corresponding to the motor current IM back to the main CPU 40 (in a negative feed back loop).

The operations of the electronic control unit 3 and the associated rear wheel steering mechanism 2 as well as the electric motor 4 will now be described below with reference to FIGS. 1 to 9. Here, the operation of the rear wheel steering apparatus 1 will be discussed with respect to the normal operating condition and the system trouble (defected) condition. The system trouble of the rear wheel steering apparatus 11 corresponds to cases in which at least one of the main CPU 40 and the sub CPU 50 is brought into trouble, at least one of the main FETs 82, 83, 84 and 85 (viz., the main FET circuit 80a) is brought into trouble, and the steering stroke sensor 33 or the drive stroke sensor 14 are brought into trouble. Also, the judgment of the trouble is made such that the trouble judgment of at least one of the main FET 82, 83, 84 and 85 is carried out by the main CPU 40 which compares the target motor current and the motor current IMO detected by the motor current detecting means 90 to effect a trouble judgment when a compared error or deficiency exceeds beyond a certain level. Likewise, the trouble judgment of the steering stroke sensor 33 or the driver stroke sensor 14 are carried out by them a in CPU 40 by which compares the first and second actual steering angles ΘR1 and ΘR2 for thereby effecting a trouble judgment when a compared error exceeds the given level.

Now, the normal operation of the rear wheel steering apparatus 1 will be discussed below. Initially, in the electronic control unit 3, the main CPU 40 sets the target steering angle ΘR, the steering direction DR and the control mode on the basis of the front wheel steering information SF and the vehicle speed V. Subsequently, the main CPU 40 produces the motor control signal SMC on the basis of the target steering angle ΘR, the steering direction DR and the first actual steering angle ΘR1. Next, the electronic control unit 3 serves to energize the solenoid excitation means 60 to thereby actuate at least one of the left and right electromagnet actuators 21 and 22 or to stop the actuation of both actuators. Further, the electronic control unit 3 transmits the main motor drive signal SMD corresponding to the motor control signal SMC to the motor driver means 80 via the trouble compensation circuit 70 to cause the main FET circuit 80a of the motor driver means 80 to drive the electric motor 4 in its forward or reverse direction, or to stop the operation of the electric motor 4. Consequently, the steering shaft 30 of the rear wheel steering mechanism 2 is moved toward one of the sides of the rear wheel WL or WR, or restored in its neutral position. As a result, the rear wheels WL and WR are steered leftward or rightward, or restored to their neutral position. In this connection, the main signal SM produced by the main CPU 40 and the sub signal SS produced by the sub CPU 50 are both H signals (viz., normal condition).

Next, the trouble condition of at least one of the main CPU 40 and the sub CPU 50 will be discussed below. During this time instance, at least one of the main signal SM of the main CPU 40 and the sub signal SS of the sub CPU 50 is the L signal (viz., the trouble condition). For this reason, in the trouble compensation circuit 70 of the electronic control unit 3, the trouble judgment section 71 makes the judgment of the system trouble and sets the Relay-ON signal RON for the main relay 81, the ON signal VON for the reverse drive main FET 84 and 85 and Relay-OFF signal ROF for the forward drive relays 86 and 87 in the main motor drive signal SMD. In this instance, the electric motor 4 is operated in the reverse direction by the main FET circuit 80a of the motor driver means 80. During this operation, the steering shaft 30 of the rear wheel steering mechanism 2 is moved toward the neutral position and restored in that position. As a result, the rear wheels WL and WR are restored in the straight cruising direction. After a certain time interval has passed, the trouble compensation circuit 70 sets the Relay-OFF signal ROF in the main motor drive signal SMD for the main relay 81. Accordingly, the electronic control unit 3 renders the main FET circuit 80a of the motor driver means 80 to completely stop the operation of the electric motor 4.

The trouble condition of at least one of the main FETs 82, 83, 84 and 85 will be discussed below. In this trouble condition, the sub CPU 50 of the electronic control unit 3 sets the sub motor drive signal SSD so as to have the Relay-ON signal RON for the sub relay 88 and the PWM signal VPWM for the sub FET 89. Further, main CPU 40 of the electronic control unit 3 sets the motor control signal SMC so as to have the Relay-OFF signal ROF for the main relay 81 whereby the main FET circuit 80a of the motor driver means 80 completely stops the operation of the electric motor 4. Next, the electronic control unit 3 causes the sub FET circuit 80b of the motor driver means 80 to drive the electric motor 4 in the reverse direction. At this time instant, the steering shaft 30 of the rear wheel steering mechanism 2 is moved toward the neutral position and finally restored in that position. As a result, the rear wheels WL and WR are restored in the straight cruising direction. Consecutively, when the sub CPU 50 judges on the basis of the first actual steering angle that the rear wheel steering mechanism 2 returns to its neutral position, the sub CPU 50 sets the sub motor drive signal SDD to have the Relay-OFF signal ROF for the sub relay 88. Thus, the electronic control unit 3 causes the sub FET circuit 80b of the motor driver means 80 to completely stop the operation of the electric motor 4.

The trouble condition of the steering stroke sensor 33 or the driving stroke sensor 14 will be described. Under this condition, the main CPU 40 of the electronic control unit 3 sets the motor control signal SMC so as to have the Relay-ON signal RON for the main relay 81, the ON signal VON for the upper stage reverse drive main FET 84 and the lower stage reverse drive main FET 85 and the Relay-OFF signal ROF for the forward drive relays 86 and 87. Thus, the electronic control unit 3 is able to cause the main FET circuit 80a of the motor drive means 80 to drive the electric motor 4 in the reverse direction. In this instance, the steering shaft 30 of the rear wheel steering mechanism 2 is moved toward the neutral position and finally restored in that position. As a result, the rear wheel WL and WR are positioned in their straight cruising direction.

Consecutively, if the main CPU 40 judges on the basis of the first actual steering angles ΘR1 or the second actual steering angle ΘR2 and the motor current signal IMO that the rear wheel steering mechanism 2 is restored in its neutral position, then, the main CPU 40 sets the motor control signal SMC so as to have the Relay-OFF signal ROF for the main relay 81. Consequently, the electronic control unit 3 causes the main FET circuit 80a of the motor drive means 80 to completely stop the operation of the electric motor 4.

With the rear wheel steering apparatus 1 discussed above, even if the control means composed of the main CPU 40 and the sub CPU 50 is subjected to the trouble or failure, the trouble compensation circuit 70 causes the rear wheels WL and WR to their straight cruising direction in a highly reliable fashion. Since, in this instance, the rear wheels are not erroneously steered even in the system trouble arising in the control means of the rear wheel steering apparatus 1, the automotive vehicle A can be driven in a two wheel steering mode caused by the front wheels, providing highly improved reliability in fail-safe.

It will now be apparent from the foregoing description that the rear wheel steering apparatus according to the present invention is not limited to the preferred embodiment discussed above and various modifications may be made without departing from the scope of the invention in a manner described below.

For example, although the trouble compensation circuit as been described as comprising the analog circuit, it may be composed of a digital circuit.

Also, while the control means comprises the two CPUs composed of the main CPU and the sub CPU, the control means may be modified to have only one CPU or other constitution.

Further, although the rear wheel steering mechanism 2 has been described as including the threaded members (outer rotatable cylinders) and the steering axis (steering shaft) which are arranged in the concentric relation to one another, the steering mechanism may have other structures such as the threaded members and the steering axis arranged in a parallel relation to each other.

In addition, although the rear wheel steering mechanism 2 is constructed such that the pair of intermediate slide cylinders moves away from each other during forward rotation of the electric motor while the pair of the intermediate slide cylinders moves toward each other, the rear wheel steering mechanism 2 may be modified so as to effect the reverse movement of these component parts.

Furthermore, although, in a case where the trouble in at least one of the four main FETs is detected, the sub CPU causes the sub FET to drive the electric motor in its reverse direction, a modification may be made such that, in order to have the main FETs to drive the electric motor as much as possible, four sensors are provided to detect the trouble conditions of the respective main FETs and, when the trouble of the forward drive main FETs is detected, the main CPU causes the reverse drive main FET of the main FET circuit to drive the electric motor in its reverse direction.

It will now be understood that the rear wheel steering apparatus according to the present invention makes it possible to render the trouble compensation circuit to restore the steering axis and the slide members to the neutral position to thereby ensure the straight movement of the rear wheels of the vehicle in the failure of the control means. Consequently, the rear wheel steering apparatus ensures that the rear wheels are not erroneously steered by the failed or troubled control means, there by providing a highly reliability in fail-safe operation.

What is claimed is:

1. A rear wheel steering apparatus including an electric motor, a pair of threaded members having threaded portions which are formed in a direction opposite to one another, a pair of slide members engaging with said threaded members, respectively, to move closer to or to move away from one another due to reverse threaded action, and a steering shaft for steering a pair of rear wheels, wherein said threaded members are rotated by said electric motor and the steering shaft coupled to one of said slide members is moved toward one of the rear wheels to thereby enable steering of the rear wheels, the rear wheel steering apparatus comprising:

control means for controlling said electric motor;

motor drive means including a bridge circuit composed of four switching elements to drive said electric motor in its forward or reverse direction on the basis of an output signal delivered from said control means; and a trouble compensation circuit constituted independently of said control means for turning on said switching elements for a given time interval to drive said electric motor in a direction to actuate said pair of slide members to move toward each other during a trouble taking place in said control means.

2. A rear wheel steering apparatus according to claim 1, wherein said control means includes a plurality of CPUs; and wherein said trouble compensation circuit includes a failure discriminating section for discriminating the faulty condition of said control means; said failure discriminating section serving to discriminate the faulty condition of said control means when a failure occurs in at least one of said CPUs.

3. A rear wheel steering apparatus according to claim 2, wherein said CPUs output CPU signals, that represent whether or not the failure occurs in said CPUs, to said trouble compensation circuit; and wherein said failure discriminating section includes an AND circuit that discriminates the normal condition of said control means in response to said CPU signals only when all of said CPUs are operating under a normal condition.

4. A rear wheel steering apparatus according to claim 1, wherein said motor drive means includes a main relay connected between a power source and said bridge circuit; and wherein said trouble compensation circuit includes a main relay control section for producing a main relay signal to control ON/OFF states of said main relay for said given time interval during the faulty condition of said control means.

5. A rear wheel steering apparatus according to claim 4, wherein said main relay control section includes a delay circuit for producing an ON output signal to turn on said main relay for the given time interval, and an OFF output signal for turning off said main relay after the given time interval has elapsed.

6. A rear wheel steering apparatus according to claim 5, wherein said control means serves to transmit said main relay signal to said trouble compensation circuit; and wherein said main relay control section includes an AND circuit for producing an ON/OFF signal to turn on or turn off said main relay in response to said main relay signal, and an OR circuit for producing an ON/OFF signal to turn on or turn off said main relay in response to said signals produced by said delay circuit regardless of the ON/OFF signal produced by said AND circuit during the faulty condition of said control means.

7. A rear wheel steering apparatus according claim 1, wherein said four switching elements include two "forward driving" field effect transistors for driving said electric motor in a direction to move said pair of slide members away from one another, and two "reverse driving" field effect transistors for driving said electric motor in another direction to move said pair of slide members close to one another; and wherein said trouble compensation circuit includes a "forward driving" FET driver section for controlling ON/OFF states of said first group of two field effect transistors, said "forward driving" FET driver section serving to turn off said two "forward driving" field effect transistors during the faulty condition of said control means.

8. A rear wheel steering apparatus according claim 7, wherein said control means serves to output a "forward driving" FET control signal, that controls said "forward driving" two field effect transistors, to said trouble compensation circuit; and wherein said "forward driving" FET driver section includes an AND circuit for producing an OFF signal to turn off said two "forward driving" field effect transistors regardless of said "forward driving" FET control signal during the faulty condition of said control means.

9. A rear wheel steering apparatus according to claim 1, wherein said four switching elements include two "forward driving" field effect transistors for driving said electric motor in a direction to move said pair of said slide members away from one another, and two "reverse driving" field effect transistors for driving said electric motor in another direction to move said pair of slide members close to one another during the faulty condition of said control means; and wherein said trouble compensation circuit includes a "reverse driving" FET driver section to control ON/OFF states of said two "reverse driving" field effect transistors, said "reverse driving" FET driver section serving to turn off said two "reverse driving" field effect transistors during the faulty condition of said control means.

10. A rear wheel steering apparatus according to claim 9, wherein said control means serves to output a "reverse driving" FET control signal, that controls said two "reverse driving" field effect transistors, to said trouble compensation circuit; and wherein said "reverse driving" FET driver section includes an AND circuit for producing an ON/OFF signal to turn on or turn off said two "reverse driving" field effect transistors in response to said "reverse driving" FET control signal during a normal condition of said control means, and an OR circuit for producing an output signal to turn on said second group of two field effect transistors regardless of the output signal of said AND circuit during the faulty condition of the control means.

11. A rear wheel steering apparatus according to claim 9, wherein said motor drive means includes a main relay connected between a power source and said bridge circuit; and wherein said trouble compensation circuit includes a main relay control section for controlling ON/OFF states of said main relay, said main relay control section serving to turn off said second group of two field effect transistors for the given time interval during the faulty condition of said control means.

12. A rear wheel steering apparatus according to claim 1, wherein said four switching elements include two "forward driving" field effect transistors for driving said electric motor in a direction to move said pair of slide members away from one another, and two "reverse driving" field effect transistors for driving said electric motor in another direction to move said pair of slide members close to one another; wherein said motor drive means includes a "forward driving" relay connected between said two "forward driving" field effect transistors and said electric motor; wherein said trouble compensation circuit includes a "forward driving" relay control section for controlling ON/OFF states of said "forward driving" relay; and wherein said "forward driving" relay control section serves to turn off said "forward driving" relay during the faulty condition of said control means.

13. A rear wheel steering apparatus according to claim 12, wherein said control means serves to outputs a "forward driving" relay signal, that controls ON/OFF states of said "forward driving" relay, to said trouble compensation circuit; and wherein said "forward driving" relay control section includes an AND circuit for producing an OFF signal to turn off said "forward driving" relay regardless of said "forward driving" relay control signal during the faulty condition of said control means.

14. A rear wheel steering apparatus according to claim 1, wherein said four switching elements include two "forward driving" field effect transistors for driving said electric motor in a direction to move said pair of slide members away from one another, and two "reverse driving" field effect transistors for driving said electric motor in another direction to move said pair of slide members close to one another; wherein said motor drive means includes a main relay connected between a power source and said bridge circuit; wherein said trouble compensation circuit includes a main relay control section for controlling ON/OFF states of said main relay, a "forward driving" FET driver section for controlling ON/OFF states of said two "forward driving" field effect transistors, and a "reverse driving" FET driver section for controlling ON/OFF states of said two "reverse driving" field effect transistors; and wherein said main relay control section serves to turn on said main relay, said "forward driving" FET driver section turns off said two "forward driving" field effect transistors, and said "reverse driving" FET driver section turns on said two "reverse driving" field effect transistors are turned on, for the given time interval during the faulty condition of said control means.

15. A rear wheel steering apparatus according to claim 14, wherein said control means serves to output a main relay signal to control ON/OFF states of said main relay, a "forward driving" FET control signal for controlling ON/OFF states of said two "forward driving" field effect transistors and a "reverse driving" FET control signal for controlling said two "reverse driving" field effect transistors; wherein said main relay control section includes a delay circuit for outputting an ON output signal to turn on said main relay for the given time interval during the faulty condition of said control means while outputting OFF output signal to turn off said main relay after the given time interval, a "main relay driving" AND circuit for outputting an ON/OFF signal to control ON/OFF states of said main relay in response to said main relay signal during a normal condition of said control means, and a "main relay driving" OR circuit for producing an ON/OFF signal to control ON/OFF states of said main relay in response to the output signals produced by said delay circuit regardless of the ON/OFF signal produced by said "main relay driving" AND circuit during the faulty condition of said control means; wherein said "forward driving" FET driver section includes a "forward driving" AND circuit for producing an OFF output signal to turn off said two "forward driving" field effect transistors regardless of said "forward driving" FET control signal during the faulty condition of said control means; and wherein said "reverse driving" FET driver section includes a "reverse driving" AND circuit for producing an ON/OFF signal to control ON/OFF states of said two "reverse driving" field effect transistors in response to said "reverse driving" FET control signal during the normal condition of said control means, and a "reverse driving" OR circuit for producing an ON output signal to turn on said two "reverse driving" field effect transistors regardless of the output signal produced by said "reverse driving" AND circuit during the faulty condition of said control means.

16. A rear wheel steering apparatus according to claim 14, wherein said motor drive means includes a "forward driving" relay connected between said two "forward driving" field effect transistors and said electric motor; and wherein said trouble compensation circuit includes a "forward driving" relay control section for controlling ON/OFF of said "forward driving" relay; said "forward driving" relay control section serving to turn off said "forward driving" relay during the faulty condition of said control means.

17. A rear wheel steering apparatus according to claim 15, wherein said motor drive means includes a "forward driving" relay connected between said two "forward driving" field effect transistor and said electric motor; wherein said control means serves to output said "forward driving" relay control signal, that controls the ON/OFF states of said "forward driving" relay, to said trouble compensation circuit; and wherein said trouble compensation circuit includes a "forward driving" relay control section for controlling ON/OFF states of said "forward driving" relay; said "forward driving" relay control section including an AND circuit for said "forward driving" relay for outputting an OFF output signal to turn off said "forward driving" relay regardless of said "forward driving" relay control signal during the faulty condition of said control means.

18. A rear wheel steering apparatus according to claim 14, wherein said control means includes a plurality of CPUs; wherein said trouble compensation circuit includes a failure discriminating section for discriminating whether a failure occurs in said control means, said failure discriminating section discriminating that the failure occurs in said control means when the failure occurs in at least one of said CPUs; and wherein said two "reverse driving" field effect transistors are turned on for the given time interval when the failure occurs in at least one of said CPUs.

19. A rear wheel steering apparatus according to claim 17, wherein said control means includes a plurality of CPUs for outputting CPU signals, respectively, each of which represents whether or not a failure occurs in said each of the CPUs, to said trouble compensation circuit; wherein said trouble compensation circuit includes a failure discriminating section for discriminating the faulty condition of said control means; wherein said failure discriminating section includes a fault detecting AND circuit for discriminating that the control means is operating under the normal condition, only when all of said CPUs are operating under the normal condition, in response to said plurality of CPU signals; wherein said main relay control section includes an inverting circuit for inverting an output signal produced by said fault detecting AND circuit to produce an inverted output signal; wherein said delay circuit and said "reverse driving" OR circuit are supplied with the inverted output signal produced by said inverting circuit as a signal for discriminating whether the failure occurs in said control means; and wherein said "main relay driving" AND circuit, said "forward driving" AND circuit, said "reverse driving" AND circuit, and said AND circuit for said "forward driving" relay are supplied with output signal produced by said fault detecting AND circuit for discriminating whether the failure occurs in said control means; and wherein said two "reverse driving" field effect transistors are turned on for the given time interval only when the failure occurs in at least one of said plurality of CPU signals.

* * * * *